(12) United States Patent
Iitsuka

(10) Patent No.: US 8,244,690 B2
(45) Date of Patent: *Aug. 14, 2012

(54) STORAGE SYSTEM

(75) Inventor: Takayoshi Iitsuka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,497

(22) Filed: Jun. 13, 2011

(65) Prior Publication Data

US 2011/0246431 A1 Oct. 6, 2011

Related U.S. Application Data

(63) Continuation of application No. 11/682,359, filed on Mar. 6, 2007, now Pat. No. 7,984,026.

(30) Foreign Application Priority Data

Dec. 26, 2006 (JP) ................. 2006-350236

(51) Int. Cl.
*G06F 7/00* (2006.01)
*G06F 17/00* (2006.01)
*G06F 17/30* (2006.01)
*G06F 12/00* (2006.01)

(52) U.S. Cl. ......... 707/692; 707/736; 707/741; 707/823

(58) Field of Classification Search ................. 707/692, 707/741, 823, 736

See application file for complete search history.

(56) References Cited

U.S. PATENT DOCUMENTS

| 5,813,008 A | 9/1998 | Benson et al. |
| 6,389,433 B1 | 5/2002 | Bolosky et al. |
| 6,547,829 B1 * | 4/2003 | Meyerzon et al. ............ 715/234 |
| 7,730,113 B1 * | 6/2010 | Payette et al. ................. 707/821 |
| 2006/0155739 A1 * | 7/2006 | Broder et al. ................. 707/102 |
| 2008/0144079 A1 * | 6/2008 | Pandey et al. ................ 358/1.15 |

OTHER PUBLICATIONS

Oracle 9i Application Developer's Guide-Large Objects, 2002, pp. 1-2.
Office Action in JP Patent Application 2006-350236, dated Dec. 6, 2011 (in Japanese, 3 pgs.), [English language translation, 3 pgs.].
Masahide Ito, "Integrated E-Mail Management" is a Common Sense of Companies Part 1: "E-mail is now "Official Company Document". Company-wide appropriate management is needed. Roles of "Mail Archive"—An Indispensable Tool in Compliance Era", Computer World Get Technology Right, Japan, IDG Japan, Inc. 2006, Jul. 1, vol. 3, No. 7, p. 84-89.

* cited by examiner

*Primary Examiner* — Cheyne Ly
*Assistant Examiner* — Kris Mackes
(74) *Attorney, Agent, or Firm* — Antonelli, Terry, Stout & Kraus, LLP.

(57) ABSTRACT

The present invention relates to a storage system including a de-duplicate function and a full-text search function or the like, and reduces an amount of index information about full-test search to save storage resource. In this system, a storage apparatus includes a processing unit for de-duplicating a plurality of files having the same content regarding a file group of data inputted/outputted through a host apparatus. A full-text search processing server performs a full-text search processing to the file group and includes a processing unit for causing the full-text search processing to correspond to de-duplicate. An index information creation processing performed to a plurality of target files having the same content by the full-text search processing unit is inhibited according to a status of de-duplicate to the file group by the processing unit. Thereby, the amount of index information can be reduced.

10 Claims, 19 Drawing Sheets

FIG. 7A

| Metadata Of File | | De-duplicate Group Information (C2) | |
|---|---|---|---|
| File ID | File Name | Representative File Flag | Next File ID |
| FID1 | "¥¥nas1¥d¥file1" | TRUE | FID2 |
| FID2 | "¥¥nas1¥d¥file2" | FALSE | FID1 |
| FID3 | "¥¥nas1¥d¥file3" | TRUE | FID3 |

320 — Keyword Information

| Keyword | Occurrence Position Information ID (LID) |
|---|---|
| "apple" | IDX11 |
| "orange" | IDX21 |
| ⋮ | ⋮ |

330 — Occurrence Position Information

| LID | Next LID | File ID | Occurrence Position Information |
|---|---|---|---|
| ⇨ IDX11 | IDX13 | FID1 | 10,24 |
| IDX13 | NULL | FID3 | 8 |
| ⋮ | ⋮ | ⋮ | ⋮ |
| IDX21 | NULL | FID3 | 18 |
| ⋮ | ⋮ | ⋮ | ⋮ |

| | | | |
|---|---|---|---|
| ⇨ IDX11 | IDX12 | FID1 | 10,24 |
| ⇨ IDX12 | IDX13 | FID2 | 10,24 |
| IDX13 | NULL | FID3 | 8 |

700 <Example Of Search-Target File Group>

| | <File Name> | <File Content> |
|---|---|---|
| F1 | ¥¥nas1¥d¥file1 | He likes apple. I like apple. |
| F2 | ¥¥nas1¥d¥file2 | He likes apple. I like apple. |
| F3 | ¥¥nas1¥d¥file3 | I like apple and orange. |

FIG. 9

601 — De-duplicate Information (C1)

| File Name | File Name Of Representative File |
|---|---|
| "¥d¥file1" | "¥d¥file1" |
| "¥d¥file2" | "¥d¥file1" |
| "¥d¥file3" | "¥d¥file3" |

603 — Signature Hash

| Signature | Name List Of Files Having Same Signature |
|---|---|
| SGN1 | "¥d¥file1" |
| SGN3 | "¥d¥file3" |

<Search Result (1)>

900 — Search Result Information

| LID | Next LID | File ID | Occurrence Position Information |
|---|---|---|---|
| IDX91 | NULL | FID1 | 10,24 |

<Search Result (2)>

900 — Search Result Information

| LID | Next LID | File ID | Occurrence Position Information |
|---|---|---|---|
| IDX91 | IDX92 | FID1 | 10,24 |
| IDX92 | NULL | FID2 | 10,24 |

Addition ⇒

<Example Of Search Result Display>

¥¥nas1¥d¥file1
He likes *apple*. I like *apple*.

¥¥nas1¥d¥file2
He likes *apple*. I like *apple*.

FIG. 12B

¥¥nas1¥d¥file1, ¥¥nas1¥d¥file2
He likes *apple*. I like *apple*.

| Signature Hash | |
|---|---|
| Signature | File ID List Of Files Having Same Signature |
| SGN1 | FID1 |
| SGN3 | FID3 |

603B 61B  62B

STORAGE SYSTEM

CROSS-REFERENCE TO RELATED APPLICATION

This application is a continuation of U.S. application Ser. No. 11/682,359, filed Mar. 6, 2007 now U.S. Pat. No. 7,984,026, and which application claims priority from Japanese Patent Application No. JP 2006-350236 filed on Dec. 26, 2006, the contents of which are hereby incorporated by reference into this application.

TECHNICAL FIELD OF THE INVENTION

The present invention relates to a storage apparatus (disc array apparatus) and a storage system including a RAID control function and the like, and an information processing system including a full-text search function. More particularly, the present invention relates to a full-text search processing for data files stored in a storage apparatus.

BACKGROUND OF THE INVENTION

Recently, a storage system including a de-duplicate function attracts attention for storage capacity saving or the like and is getting popular. For example, a NAS (Network Attached Storage) or a storage apparatus has the de-duplicate function. Regarding files (data files) to be stored or already stored in a storage area of the storage apparatus, the de-duplicate function detects and de-duplicate files having the same content (data body except for metadata or the like), for example, duplicate files or the like. That is, as control of de-duplicate, the de-duplicate function works, for a plurality of files having the same content to be stored, to restrict the number of storing to storage areas to be once or to unify the files to one common file (a representative file) and store it. Thereby, input/output to a storage area and storage capacity are saved. As a concept or term similar to de-duplicate, there are "Single Instance Store," unifying, and the like.

Further, in the storage system providing the full-text search function, the full-text search function (full-text search server or the like) performs a processing for reading files in a search target file group from a storage apparatus to create index information for full-text search. The full-text search function searches for the index information in response to a search instruction/request from a host apparatus to return the search result thereto.

U.S. Pat. No. 5,813,008 (Patent Document 1) describes a technique for de-duplicate. In the technique, the index information for search is exempt from de-duplicate (unifying).

U.S. Pat. No. 6,389,433 (Patent Document 2) describes a file server including a de-duplicate function.

SUMMARY OF THE INVENTION

In the conventional storage system including the de-duplicate function and the full-text search function, index information used for the full-text search is out of a target of the de-duplicate function. That is, regarding a plurality of files having the same content, similar index information items are individually created and reserved in a duplicating manner. Thereby, there is such a problem that a reservation amount of index information increases.

The present invention is made in view of these problems, and an object thereof is to provide a technique which relates to a storage system including a de-duplicate function and a full-text search function or the like, and can reduce amount of index information of full-text search to save storage resources.

The typical ones of the inventions disclosed in this application will be briefly described as follows. In order to achieve the object, the present invention is a storage system or an information processing system configured to include a storage apparatus or the like, and it includes the following technical means and configuration.

The system of the present invention has a host apparatus, at least one storage apparatus, a server apparatus, and the like which are connected to one another through a network or the like. The system includes a de-duplicate function (a de-duplicate processing unit) and a full-text search function (a full-text search processing unit), and further includes a means for performing a de-duplicate processing on index information corresponding to the de-duplicate processing in the de-duplicate processing unit. As the means, the system includes a de-duplicate correspondence function (a de-duplicate correspondence processing unit) which makes the full-text search function to correspond to the de-duplicate function. In other words, the full-text search processing unit includes the de-duplicate correspondence processing unit which performs a processing for de-duplicating the index information.

The system has, for example, a first storage apparatus (a file server apparatus) such as a NAS, a second storage apparatus storing files therein, and a full-text search server apparatus including a full-text search processing unit. For example, the NAS includes a de-duplicate processing unit, and the full-text search server apparatus includes a de-duplicate correspondence processing unit. Alternatively, such a configuration can be adopted that the full-text search apparatus includes the de-duplicate processing unit and the de-duplicate correspondence processing unit. The host apparatus requests input/output of files to the NAS, and the NAS responds to the host apparatus through input/output of the files to/from the storage area (the volume) of the storage apparatus. Further, the host apparatus issues an instruction/request of full-text search of files to the full-text search server apparatus, and the full-text search server apparatus returns the result of the full-text search.

The present system performs processings such as described in the following steps (1) to (4).

(1) The de-duplicate processing unit performs a processing for de-duplicating files stored in the storage area in the storage apparatus by writing from the host apparatus or the like. Along with that, the de-duplicate processing unit or the like provides first information (de-duplicate information: C1) indicating a status (state) of the de-duplicate to the outside (the full-text search processing unit).

(2) The full-text search processing unit reads a target file group for a full-text search processing (an index information creation processing) to perform an index information creation processing including a keyword extraction processing. The de-duplicate correspondence processing unit recognizes a de-duplicate status of the target file through acquisition of the first information (C1), and creates and manages second information (de-duplicate group information: C2) indicating a de-duplicate relationship (a de-duplicate group) or the like of the target file for a full-text search processing based upon the first information (C1). For example, the second information is added to and stored in the index information in association with the first information.

(3) The de-duplicate correspondence processing unit conducts detection/determination about presence of files having the same content or the like except for the representative file in the object file group based on the first information (C1) and the second information (C2). When such files are detected, the de-duplicate correspondence processing unit inhibits a keyword extraction processing itself in the index information creation processing for a plurality of files having the same content except for the representative file. That is, when index information about a file having the same content as that of a target file is already created and stored, the full-text search processing unit does not perform the keyword extraction processing on the target file. Thereby, an amount of the index information (a stored amount) can be reduced maximally.

(4) The full-text search processing unit (the de-duplicate correspondence processing unit) performs the following processing in a search processing corresponding to a search request/instruction (including keyword information) from the host apparatus, namely, a processing including a keyword search of index information and a search result information output. Regarding the file information (namely, representative file information) included in the first search result, the full-text search processing unit adds information of a file having the same content as that of the representative file (another file belonging to the same de-duplicate group) to the search result information based upon the second information (C2) to respond to the host apparatus. Thereby, when the keyword extraction processing is not inhibited, the same search result as that of the conventional art is obtained.

The effects obtained by typical aspects of the present invention will be briefly described below. The present invention relates to a storage system including a de-duplicate function and a full-text search function, and it can mainly reduce an amount of index information for a full-text search to save storage resources.

BRIEF DESCRIPTIONS OF THE DRAWINGS

FIG. 7A is a diagram of a configuration example of a table style index information in the storage system in the first embodiment of the present invention, showing metadata of a file;

FIG. 7B is a diagram of a configuration example of a table style index information in the storage system in the first embodiment of the present invention, showing keyword information;

FIG. 7C is a diagram of a configuration example of a table style index information in the storage system in the first embodiment of the present invention, showing occurrence position information;

FIG. 7D is a diagram of a configuration example of table-style index information in the storage system in the first embodiment of the present invention, showing occurrence position information in a conventional configuration;

FIG. 8 is a diagram showing an example of a search-target file group in the storage system in the first embodiment of the present invention;

FIG. 9 is a diagram showing a configuration example of de-duplicate information (C1) in the storage system in the first embodiment of the present invention;

FIG. 10 is a diagram showing a configuration example of a signature hash in the storage system in the first embodiment of the present invention;

FIG. 11A is a diagram of an example of a search result in the storage system in the first embodiment of the present invention, showing an ordinary first search result (which does not correspond to the de-duplicate);

FIG. 11B is a diagram of an example of a search result in the storage system in the first embodiment of the present invention, showing a second search result corresponding to the present de-duplicate;

FIG. 12A is a diagram showing a display example of a search result in the storage system in the first embodiment of the present invention;

FIG. 12B is a diagram showing a display example of the search result in the storage system in the first embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

<Conventional Art>

Figure 24:
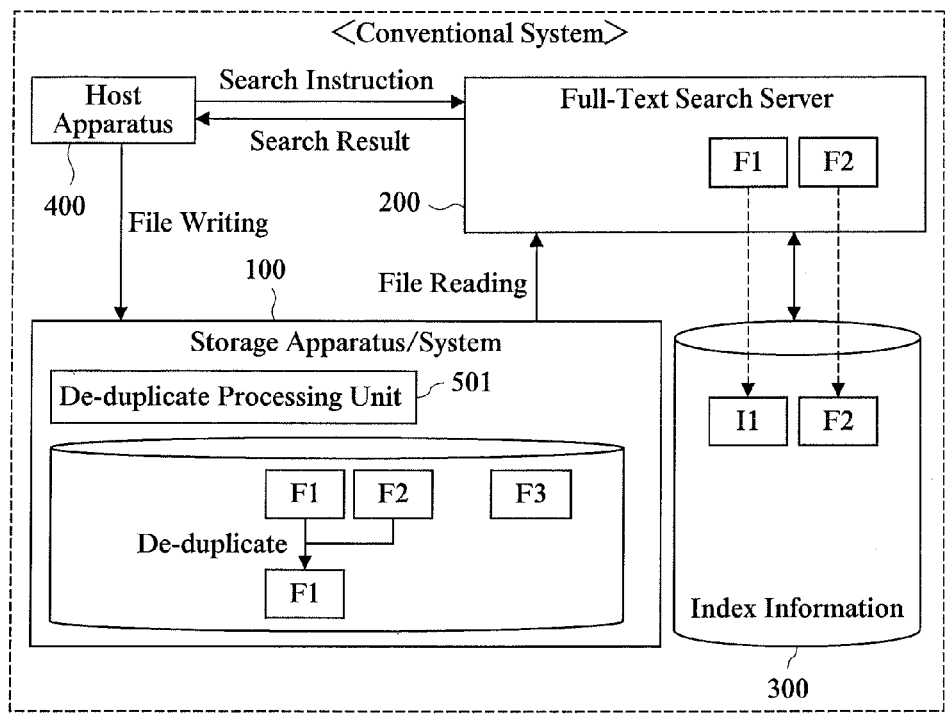
FIG. 24 is a diagram showing an outline of a configuration of a storage system including a de-duplicate function and a full-text search function in a conventional art.
Figure 25:
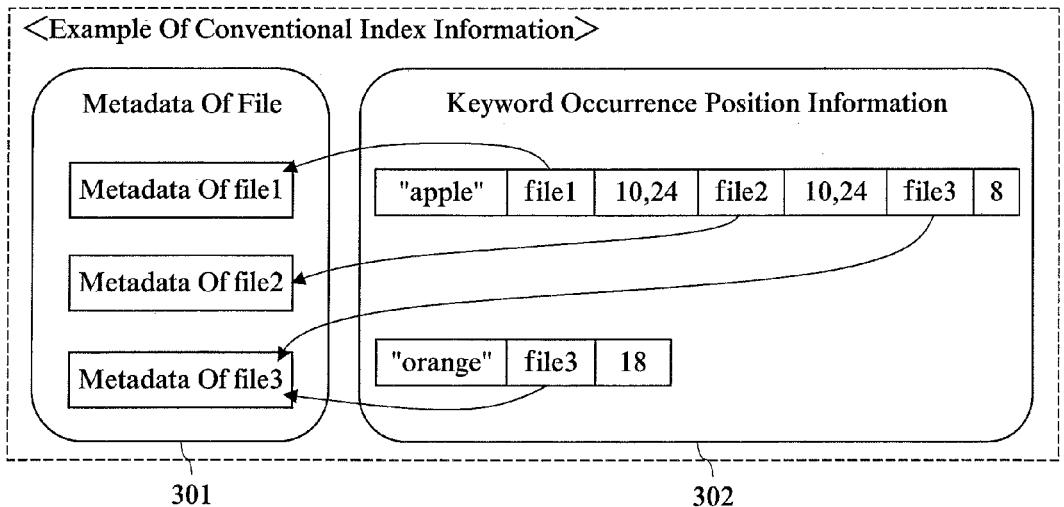
FIG. 25 is a diagram showing a configuration example of index information in a full-test search in the conventional art.

A conventional technique (a background art) corresponding to embodiments of the present invention will be briefly explained in order to describe the embodiments of the present invention in comparison with the conventional technique with reference to FIG. 24 to FIG. 25 and the like.

In FIG. 24, a conventional storage system (an information processing system) including a de-duplicate function and a full-text search function is shown. In the conventional system, through a network or the like, a host apparatus 400 and a storage apparatus 100 are connected to each other, the storage apparatus 100 and a full-text search server 200 are connected to each other, and the host apparatus 400 and the full-text search server 200 are connected to each other.

Inputting/outputting (reading/writing) of a file (for example, F1, F2, F3) is performed from the host apparatus 400 to a storage area (a storage volume or the like) in the storage apparatus 100. The storage apparatus 100 includes a storage apparatus group of such as a hard disc drive (HDD) which stores (records) data therein and a control apparatus (a controller) which performs control (RAID control or the like) on storing data to the storage area performed by the storage apparatus group.

The storage apparatus 100 includes a de-duplicate processing unit (function) 501. The full-text search server 200 includes a full-text search processing unit (function), and it performs a creation processing of index information, and the like. The de-duplicate processing unit 501 restricts storing of a plurality of files (for example, F1, F2) having the same content to storing once or unifies these files to one common file (a representative file: for example, F1) and store the same. Thereby, input/output to a storage area in the storage apparatus 100 and storage capacity can be saved.

In the present system, the following processing is performed as the full-text search processing. The host apparatus 400 writes a file on the storage area in the storage apparatus 100 having the de-duplicate function, for example. The full-text search server 200 connected to the storage apparatus 100 performs a processing for reading a search-target file group (for example, F1, F2) from the storage apparatus 100 to create index information 300 (for example, I1, I2) for the full-text search. The full-text search server 200 searches for the index information 300 utilizing keyword information in response to a search instruction/request (including designation of keyword information for search) from the host apparatus 400 to return the search result (search result information) to the host apparatus 400.

In a creation processing of the index information 300 performed by the full-text search server 200, a plurality of information items (keyword occurrence position information and the like) are created for one file in a distributing manner. Therefore, it is difficult to unify (de-duplicate) the index information items 300. The full-text search server 200 cannot sense whether or not a file read from the storage apparatus 100 with the de-duplicate function was de-duplicated (a de-duplicate state), or the like. Therefore, the full-text search server 200 extracts keywords from a plurality of files (for example, F1, F2) having the same content independently to create/add index information items 300 (for example, I1, I2). In general, a ratio of an amount of all the index information items 300 to a whole file storage amount of the storage apparatus 100 with the de-duplicate function is relatively large, and the storage resource is therefore wasted. Particularly, when many files having the same content are written in the storage area in the storage apparatus 100 with the de-duplicate function, the amount of the index information items 300 becomes significantly large as compared with a storage amount of all files in the file group.

In FIG. 25, an example of conventional index information 300 is shown. The conventional index information 300 has metadata 301 of files (for example: file1 (F1), file2 (F2), file3 (F3)) and keyword occurrence position information 302 associated therewith. The metadata 301 includes general file management information, attribute information, and the like. Keyword occurrence position information 302 is information indicating a file where a keyword (a word) occurs and a position (an address) in the file where the keyword occurs. In FIG. 25, for example, a case that a keyword "apple" is included at positions of the tenth character and twenty-fourth character in F1 and F2 and at a position of the eighth character in F3, respectively, while a keyword "orange" is included at a position of the eighteenth character in F3 is shown. In general, the keyword occurrence position information 302 occupies a major part of the index information 300.

In this example, an example of a small-sized file is shown as the target file in order to simplify explanation, but a size of a file is generally large such as 10 KB or more. Therefore, the keyword occurrence position information 302 becomes large in amount and it occupies major part in the amount of the index information 300. Conventionally, a ratio of an amount of index information to a file is generally estimated to be about 30%.

<General Outline>

Figure 1:
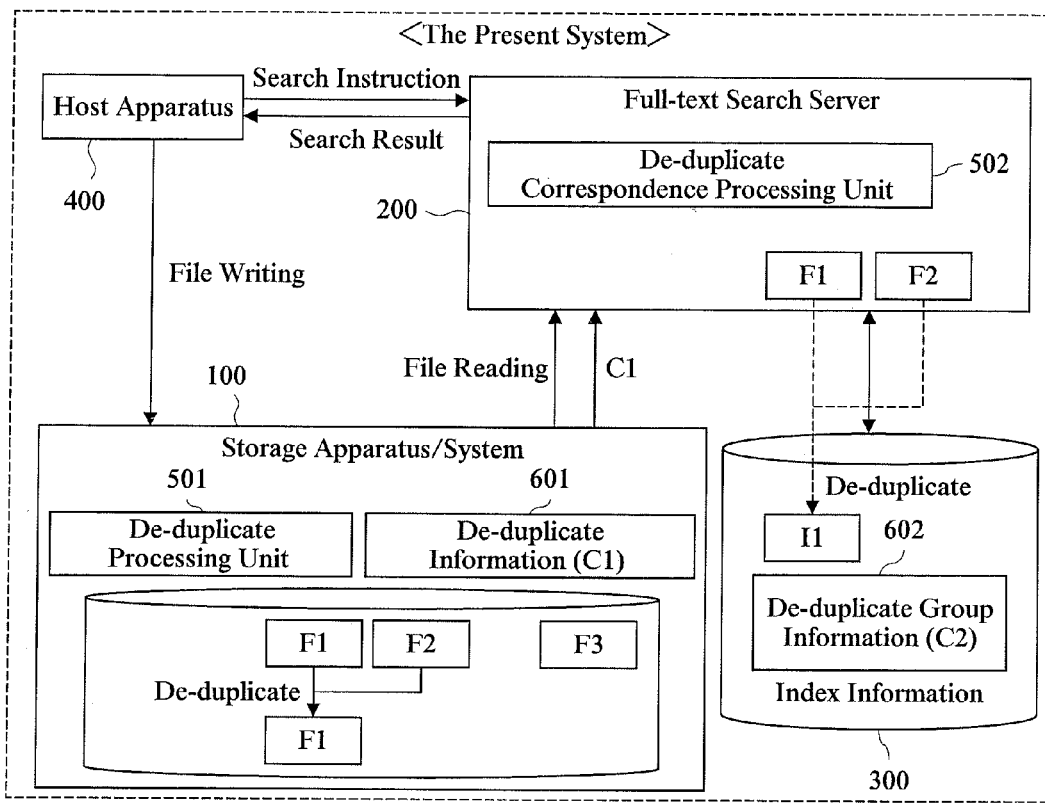
FIG. 1 is a diagram showing an outline of a configuration of a storage system in an embodiment of the present invention.

Next, in FIG. 1, an outline of a configuration of a storage system (an information processing system) of an embodiment of the present invention is shown. The system has a host apparatus (a client apparatus) 400, a storage apparatus 100 having a de-duplicate function, and a full-text search server 200 having a full-text search function. The storage apparatus 100 includes a de-duplicate processing unit (function) 501, and it creates and manages de-duplicate information (C1) according to a de-duplicate processing performed by the de-duplicate processing unit 501 to provide the same to the outside (full-text search server 200). In the full-text search server 200, a de-duplicate correspondence processing unit 502 is included in the full-text search function (processing unit). The de-duplicate correspondence processing unit 502 is a unit for realizing a de-duplicate of index information, i.e. full-text search processing corresponding to the de-duplicate processing in the de-duplicate processing unit 501. In the fill-text search server 200 (the full-text search processing unit), a creation processing of index information (including a keyword extraction processing), creation/management of de-duplicate information (C2) 602, inhibition of a keyword extraction processing for files having the same content, a search result information output corresponding to the de-duplicated index information, and the like are performed (described later). Note that, as a storage means to be stored with the index information 300, any storage means can be utilized.

In this system, the following processings (1) to (4) are performed. To facilitate explanation, it is assumed that the full-text search server 200 first extracts a target file group (a search-target file group) for the full-text search processing, and metadata of files are already created in the index information 300.

(1) Files (for example, F1, F2, F3) are written from the host apparatus 400 to the storage apparatus 100. The storage apparatus 100 properly performs de-duplicate processing on each file (for example, F1, F2) stored in its own storage area in the de-duplicate processing unit 501 (F1 is set as a representative file by de-duplicating F1 and F2). Along with that, de-duplicate information (C1) which is control information indicating the de-duplicate status is updated, and it is provided to an external full-text search server 200 in a readable state thereof. The de-duplicate information (C1) includes information about presence/absence of files having the same content (de-duplicated files), metadata of a representative file, and the like.

(2) The full-text search server 200 reads and acquires the de-duplicate information (C1) from the storage apparatus 100 in the processing (creation processing of index information) for the search-target files (for example, F1, F2, F3), and it adds de-duplicate group information (C2) to the index information 300 based on the de-duplicate information (C1). The de-duplicate group information (C2) is control information indicating a de-duplicate relationship among a plurality of files (a group of files having the same content, a representative file, a link between files, and the like), which is handled the full-text search server 200 side.

(3) The full-text search server 200 detects and determines that a file (for example: F1), having the same content as that of a file (for example: F2) to be processed, is present, and that the former file itself is not a representative file, and the like, referring to the de-duplicate information (C1) and the de-duplicate group information (C2). When the full-text search server 200 detects the above fact, it inhibits the keyword extraction processing in the creation processing of index information about the file (for example, F2). Thereby, that de-duplicate of the index information 300 is not created and stored, namely, index information 300 about files having the same content is not created and stored in a duplicating manner is realized. Consequently, only the index information (example: I1) about the representative file (example: F1) is stored.

(4) In a search processing responding to a search instruction/request from the host apparatus 400, the full-text search server 200 responds to the host apparatus by providing final search result information comprising representative file information (example: F1) included in a search result of the index information 300 (a first search result), and, referring to the de-duplicate group information (C2), information of another file (for example: F2) which belongs to the de-duplicate group of the former file (example: F1) and has the same content as the former file (example: F1).

According to the above-described processings, reduction of the amount of the index information 300 in the full-text search server 200 can be realized. Further, file reading of files having the same content is made unnecessary so that input/output processing can be reduced.

Figure 2:
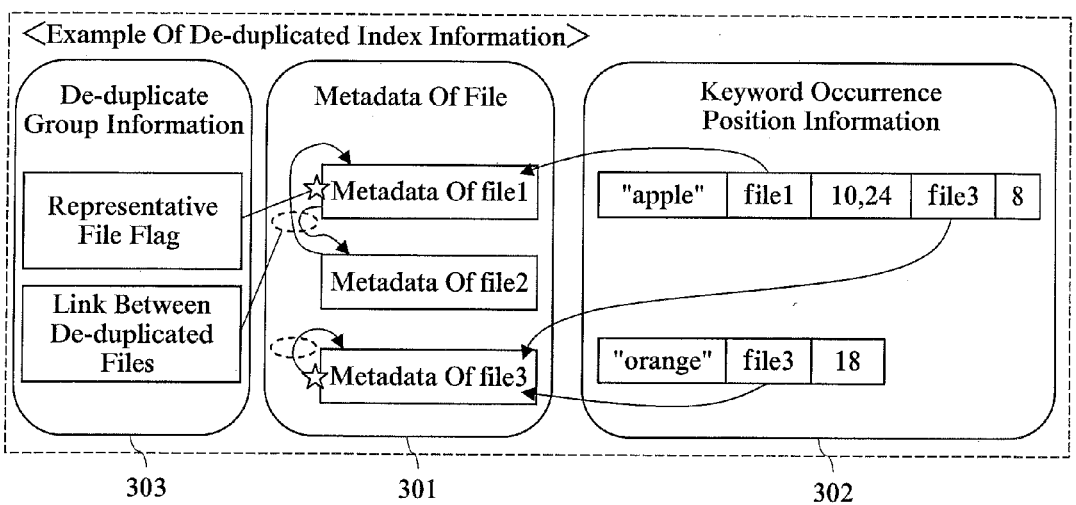
FIG. 2 is a diagram showing a configuration example of index information de-duplicated in the outline of the storage system of the embodiment of the present invention.

In FIG. 2, an example of the index information 300 de-duplicated in this system is shown. FIG. 2 shows the case regarding the same files (F1, F2, F3) as those in FIG. 25. The index information 300 includes not only the metadata 301 of the file and the keyword occurrence position information 302 but also de-duplicate group information (C2) 303 (corresponding to the above-mentioned 602). The de-duplicate group information (C2) 303 includes a mark/flag (a representative file flag) indicating a representative file of de-duplicated files having the same content, a link between metadata items of files having the same content (a link between de-duplicated files) for each group of files de-duplicated. For example, when F1 and F2 have the same content, the keyword occurrence position information 302 about F2 is not stored but a link to F1 which is the representative file is included.

The keyword occurrence position information 302 is approximately proportional to the size of a file. Therefore, a rate of reduction of the amount of index information 300 obtained according to de-duplicate, which is the feature of the present system, becomes approximately equal to a rate of reduction of file capacity in the storage apparatus 100 having the de-duplicate function. Further, in the conventional storage apparatus having the de-duplicate function, it is estimated that the file storage amount obtained by the de-duplicate function can be reduced to about ½ to ¹⁄₂₀ thereof. Therefore, it is estimated that the index information according to the de-duplicate which is the feature of the present system is reduced to be in a range of about ½ to ¹⁄₂₀ thereof.

First Embodiment

Next, a storage system of a first embodiment of the present invention will be explained with reference to FIG. 3 to FIG. 12. The first embodiment has a storage system configuration provided with a NAS including a de-duplicate function, a storage apparatus, and a full-text search server, where the full-text search server is configured to have a function (de-duplicate correspondence processing unit) corresponding to the de-duplicate function. In the first embodiment, various information items other than files are stored in the storage apparatus in a collective manner.

<System (1)>

Figure 3:
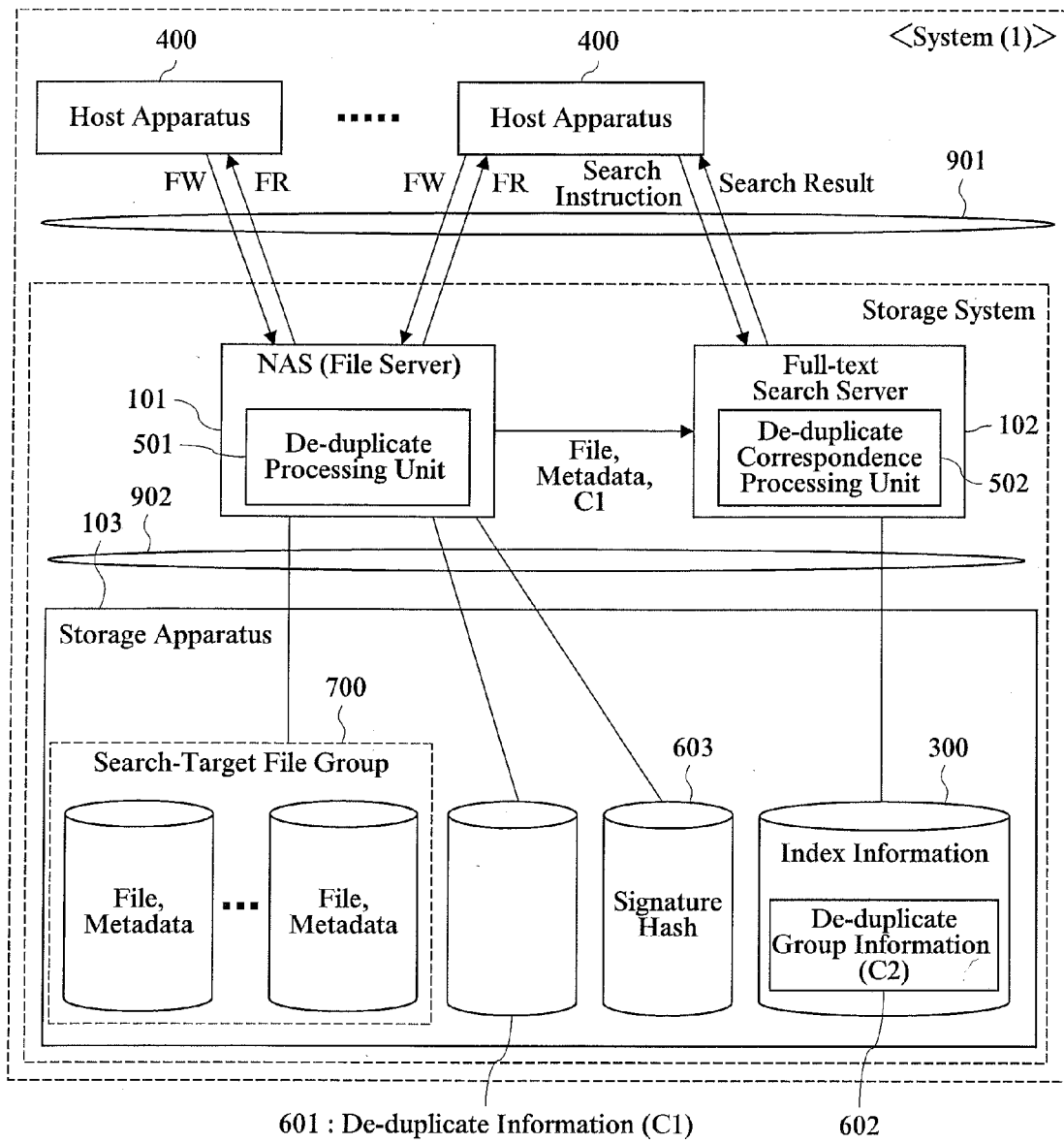
FIG. 3 is a diagram showing a configuration of a storage system in a first embodiment of the present invention.

FIG. 3 shows a configuration of the storage system according to the first embodiment. In the whole system, the storage system including the de-duplicate function and the full-text search function is connected to a group of host apparatuses 400 via a network 901. The storage system has a NAS (file server) 101, a full-text search server 102 (which is the same with the full-text search server 200), and a storage apparatus 103, and the servers and apparatus are connected to one another via a network 902.

The host apparatus 400 may be a business server, a user PC, or the like. The host apparatuses 400, the NAS 101, and the full-text search server 102 are connected via the network 901 such as an IP-LAN. The network 902 may be a SAN (a storage area network) or the like according to a fiber channel protocol.

The NAS 101 serves as a file server to the host apparatus 400 and it stores input/output files from the host apparatus 400 into a storage area (volume) in the storage apparatus 103. The NAS 101 includes a de-duplicate processing unit 501. The de-duplicate processing unit 501 restricts storing of files having the same content to the storage area in the storage apparatus 103 to one time as processing for de-duplicate.

Figure 6:
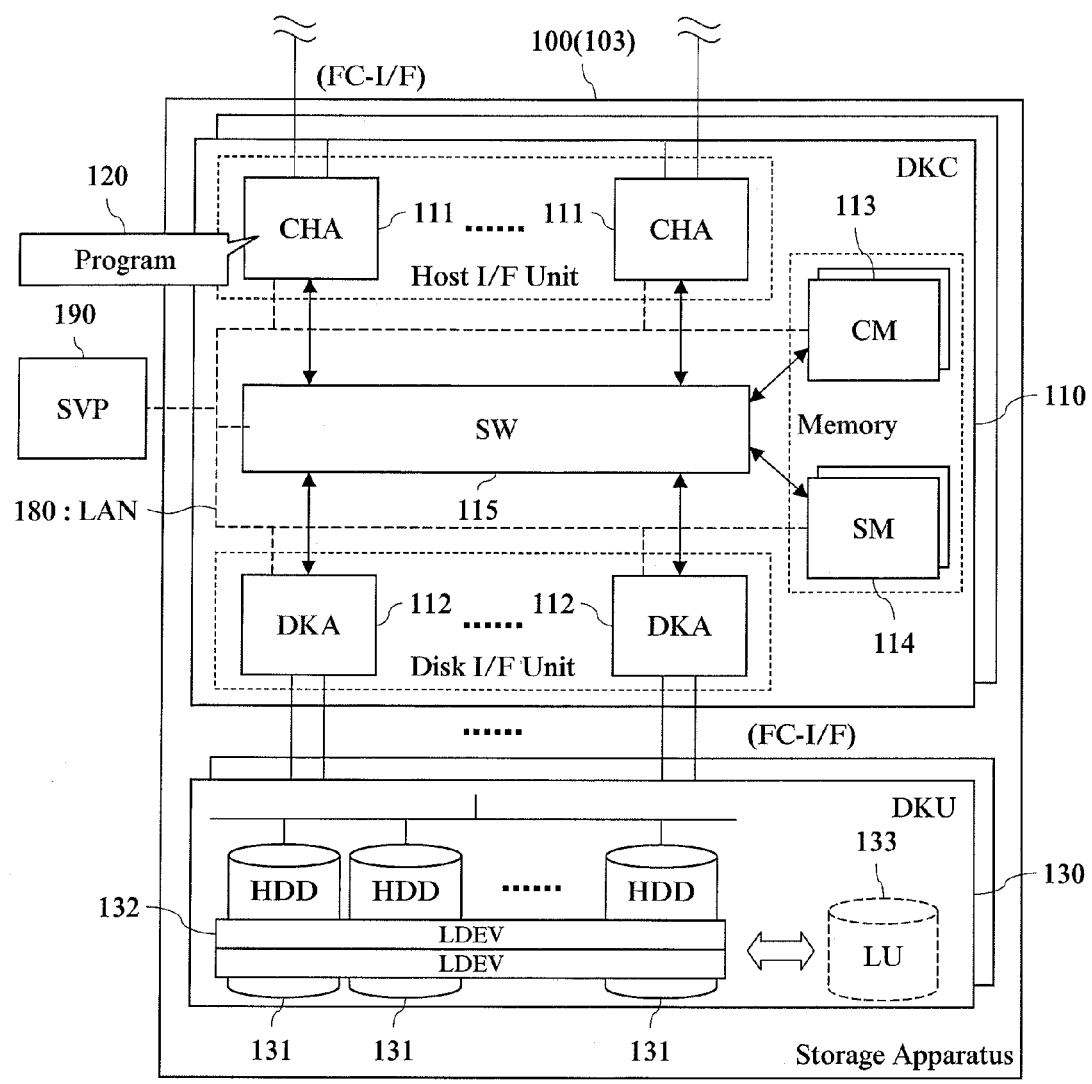
FIG. 6 is a diagram showing a detailed configuration example of a storage apparatus in the storage system in the first embodiment of the present invention.

The storage apparatus 103 is a storage apparatus having a RAID control function such as, for example, shown in FIG. 6. A search-target file group 700, de-duplicate information (C1) 601, a signature hash 603, index information 300 (including de-duplicate group information (C2) 602), and the like are stored in the storage area in the storage apparatus 103. The search-target file group 700 includes a plurality of files (data body) and metadata thereof inputted/outputted via the host apparatus 400, and they are targets to which a full-text search processing is performed by the full-text search server 102. Regarding the signature hash 603 information, only a representative file thereof is stored.

<Flow of Processing>

In FIG. 3, a flow of a processing proceeds in the following manner. For example, a file is written from the host apparatus 400 into the NAS 101 (FW: file writing, FR: file reading). The NAS 101 stores a file (data body) and metadata thereof in the storage area (the search-target file group 700) in the storage apparatus 103.

Figure 16:
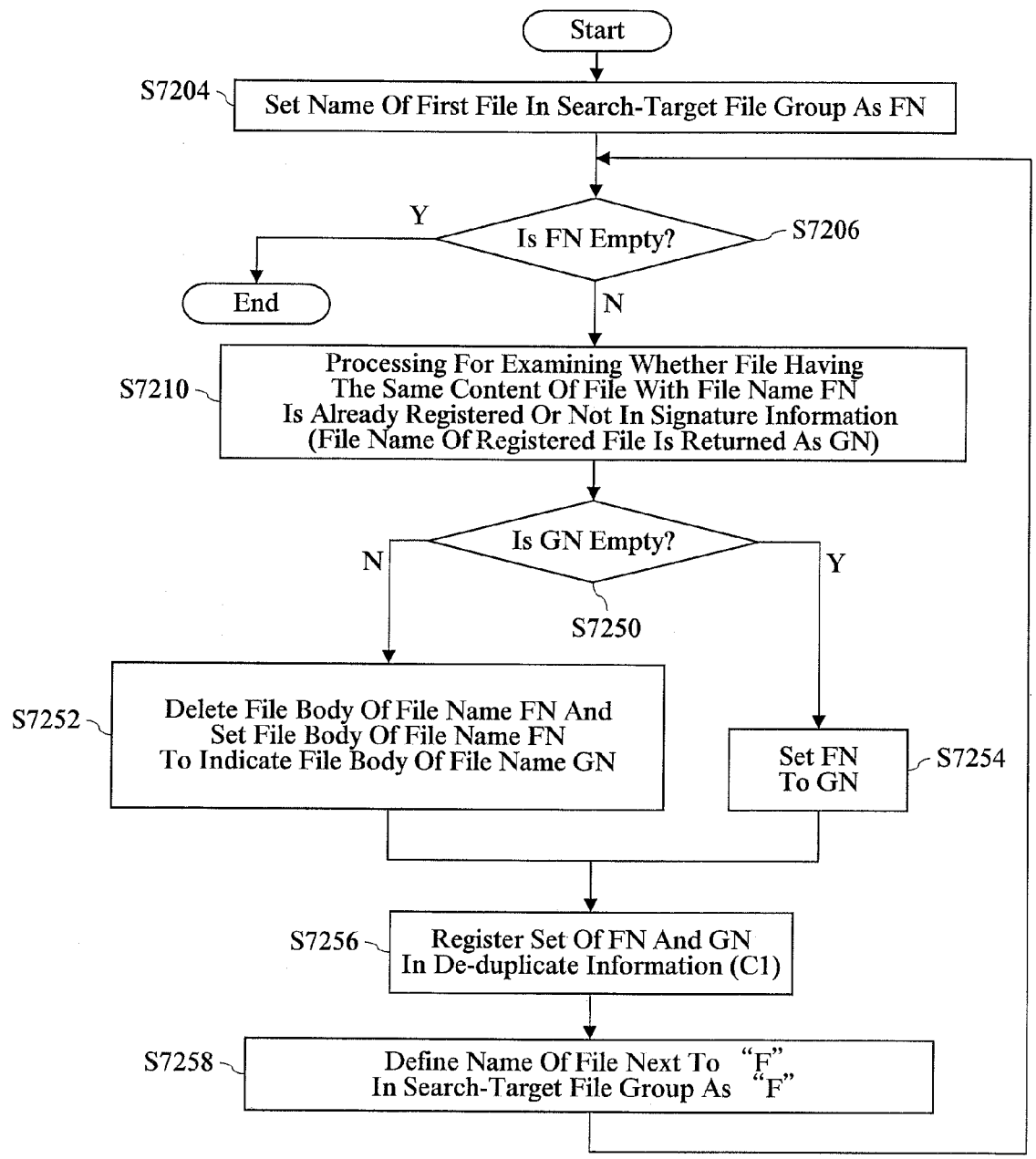
FIG. 16 is a flowchart of a de-duplicate processing in the de-duplicate processing unit in the storage systems in the first and second embodiments of the present invention.

In the de-duplicate processing unit 501 (its particular processing is shown in FIG. 16), files having the same content in the files stored in the storage apparatus 103 are de-duplicated. That is, as a file to be stored (data body), only one of the files is left as a representative file. And other files (data bodies) having the same content are deleted. The left representative file (the data body) is used as a substitute for other files (data bodies) having the same content. Such a de-duplicate processing is known.

The de-duplicate processing unit 501 performs a processing for creating and storing a signature hash 602 (whose configuration example is shown in FIG. 10) which is a hash value of the left representative file, and a processing for creating and storing de-duplicate information 601 (whose configuration example is shown in FIG. 9) indicating a status of the de-duplicate to provide them to the outside in the de-duplicate processing.

Figure 4:
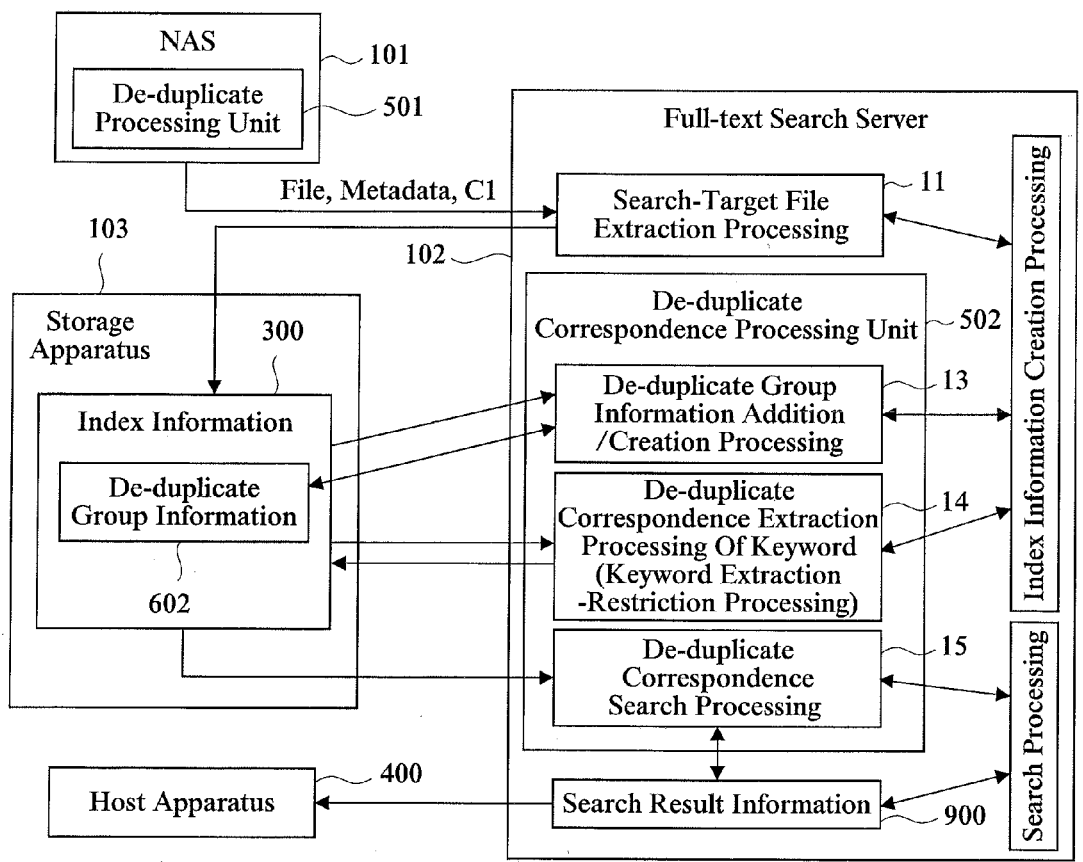
FIG. 4 is a diagram showing a detailed configuration of a full-text search server and a de-duplicate correspondence processing unit in the storage system in the first embodiment of the present invention.

The full-text search server 102 creates index information 300 (whose configuration example in this system is shown in FIG. 7) to files included in the search-target file group 700 stored in the NAS 101. Therefore, the full-text search server 102 reads target files (a data body) for creation processing of the index information 300 and metadata thereof via the NAS 101. At this time, the full-text search server 102 acquires de-duplicate information (C1) 601 from the NAS 101 in addition to the target file and the metadata. The de-duplicate correspondence processing unit 502 (whose detailed configuration is shown in FIG. 4) in the full-text search server 102 uses the acquired de-duplicate information (C1) 601 to perform a full-text search processing (including an index information creation processing) corresponding to a processing in the de-duplicate processing unit 501. Thereby, the same result as an existing full-text search result can be obtained while reducing the amount of the index information 300. The de-duplicate group information (C2) 602 (whose configuration example is shown in FIG. 7) is one expressed by taking the de-duplicate information (C1) 601 into the index information 300 in the full-text search server 102, and creating and reading are performed in the de-duplicate correspondence processing unit 502.

The full-text search server 102 performs a search processing (including the keyword search processing of the index information 300) in response to a search instruction from the host apparatus 400 to display the search result information on a screen in response to the host apparatus 400 (a search result display example is shown in FIG. 12). At this time, the full-text search server 102 adds, to the search result information, information about the file having the same content and belonging to the de-duplicate group to which the representative file belongs in addition to the representative file. A user of the host apparatus 400 can read the file from the storage apparatus 103 through the NAS 101 to display the file by conducting such an operation like clicking a file name link in the search result information displayed on the screen.

<Full-Text Search Server and De-Duplicate Correspondence Function>

In FIG. 4, a detailed configuration of the full-text search server 102 and the de-duplicate correspondence processing unit 502 are shown. The full-text search server 102 performs such processings such as: an extraction processing of search-target file 11; a de-duplicate group information addition/creation processing 13 in the de-duplicate correspondence processing unit 502; a de-duplicate correspondence keyword extraction processing (a keyword extraction-inhibiting processing) 14; and a de-duplicate correspondence search processing 15.

The extraction processing of search-target file 11 (which is specifically shown in FIG. 18) is a processing similar to a conventional processing. The de-duplicate group information addition/creation processing 13 (which is specifically shown in FIG. 19) is a processing characterizing the present system. The de-duplicate correspondence keyword extraction processing 14 (which is specifically shown in FIG. 20) and the de-duplicate correspondence search processing 15 (which is specifically shown in FIG. 21) are processings obtained by modifying conventional similar processings to correspond to the de-duplication in this system.

The extraction processing of search-target file 11, the de-duplicate group information addition/creation processing 13, and the de-duplicate correspondence keyword extraction processing 14 are performed at the time of the index information creation processing. The de-duplicate correspondence search processing 15 is performed at a time of a search processing responding to an instruction from a user of the host apparatus 400, where a search result information 900 is created and it is fed to the host apparatus 400 for displaying.

<Host Apparatus, NAS, and Full-Text Search Server>

Figure 5:
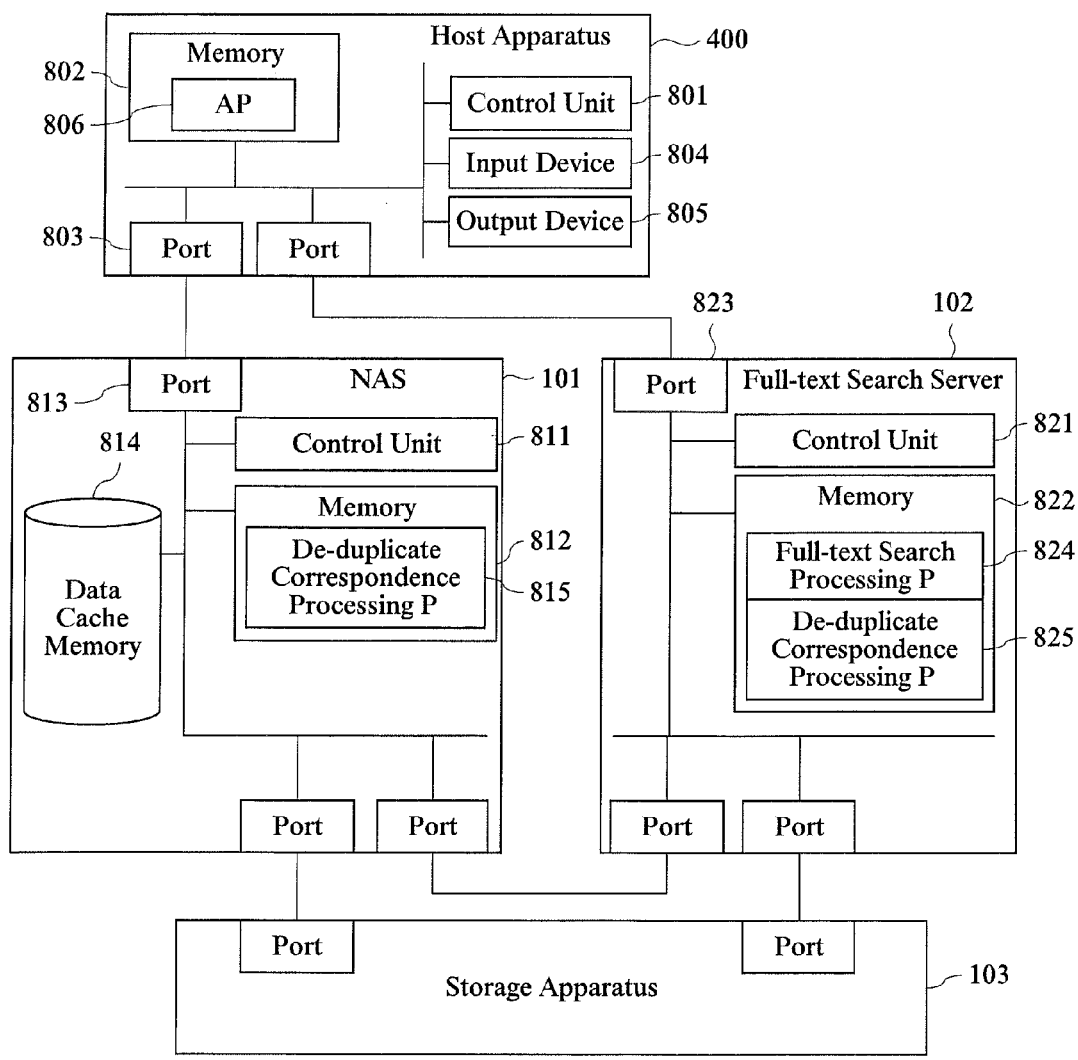
FIG. 5 is a diagram showing a hardware configuration of a host apparatus, a NAS, and a full-text search server in the storage system in the first embodiment of the present invention.

In FIG. 5, hardware configurations of the host apparatus 400, the NAS 101, and the full-text search server 102 are shown. The host apparatus 400 includes a control unit (CPU) 801, a memory 802, a port (communication processing unit) 803, an input device 804 such as a keyboard or a mouse, an output device 805 such as a display, and the like. A function of the host apparatus 400 can be realized by causing the control unit 801 to execute programs (a business application program (AP) 806, a storage management/utilization program, and the like) on the memory 802. The host apparatus 400 is communication-connected with the NAS 101 and the full-text search server 102 via the port 803.

The NAS 101 includes a control unit 811, a memory 812, a port 813, a data cache memory 814, and the like. A function of the de-duplicate processing unit 501 and the like can be realized by causing the control unit 811 to execute programs (a de-duplicate processing program (P) 801 and the like) on the memory 812. Input/output data between the host apparatus 400 and the storage apparatus 103, and the like are cached in the date cache memory 814. The NAS 101 is communication-connected with the host apparatus 400, the storage apparatus 103, and the full-text search server 102 via the port 813.

The full-text search server 102 includes a control unit 821, a memory 822, a port 823, and the like. Functions of the full-text search processing unit, the de-duplicate correspondence processing unit 502, and the like are realized by causing the control unit 821 executing programs (a full-text search processing program (P) 824, a de-duplicate correspondence processing program (P) 825, and the like) on the memory 822. The full-text search server 102 is communication-connected to the host apparatus 400, the NAS 101, and the storage apparatus 103 via the port 823.

<Storage Apparatus>

In FIG. 6, an example of a detailed configuration of the storage apparatus 100 (especially, the storage apparatus 103) is shown. The storage apparatus 100 includes a DKC (disc controller) 110 having a control (storage control) function and a DKU (disc unit) 130 having a storage function, and it is connected with or built in with an SVP (service processor) 190 including a maintenance and management function and the like.

The DKC 110 has: a CHA (channel adaptor) 111; a DKA (disc adaptor) 112; a CM (cache memory) 113, an SM (shared memory) 114; and an SW (crossbar switch) 115, as a processing unit in this embodiment. The respective means are connected to be capable of performing mutual communications and data transfers via data transfer control and path switching at the SW 115. The respective means are connected to the SVP 190 via an inner LAN 180. In the CHA 111, the DKA 112, and the like, a program 120 corresponding to a predetermined processing is executed. The CHA 111 group corresponds to the host I/F (interface) unit, while a group of the DKAs 112 corresponds to the disc I/F unit.

The CHA 111 is a mean for performing channel I/F control (host I/F control) to an external apparatus. The DKA 112 is a mean for performing disc I/F control to the HDD 131. The CHA 111, the DKA 112 and the like have a communication port, and it performs a protocol communication processing of a corresponding I/F (for example, FC-I/F).

The CM 113 or the SM 114 is shared by respective means in the DKC 110, and data/information thereon is automatically backed up. The CM 113 is used to cache input/output data and the like to volume. The SM 114 is used to store various kinds of control information including configuration information, status information, and the like.

The DKU 130 comprises a storage apparatus group such as a HDD 131 and the like. Respective HDDs 131 in the DKU 130 are communication-connected to the DKA 112 via a connection network. The HDD 131 performs data-reading/writing operation to a disc region in responses to a request from the DKA 112 side.

A storage volume is set in the DKU 130 as a storage area. The storage volume includes a physical storage area (a physical volume) based upon the HDD 131, and a storage area (a logical volume) logically set on one or more physical volumes. The logical volume to/from which data is inputted/outputted is caused to correspond to, for example, an LU (a logical unit). The LU 133 is caused to correspond to a set of LDEVs (logical devices) 132. The LDEV 132 is set on a group (RAID group) of physical volumes and it is utilized as a unit of RAID control.

In the storage apparatus 100, a procedure of data input/output to an inner volume in response to a data input/output (writing/reading) request from an external apparatus (the host apparatus, the NAS, and the like) in the normal time is performed in the following manner. In the DKC 110, with a processing instruction and the like is stored in the SM 114 while caching target data in the CM 113, a data transfer processing is performed between the CHA 111 and the DKA 112 via the SW 115. A writing processing is performed in the following manner. When any CHA 111 receives a data-writing request from an external apparatus, the CHA 111 writes the writing request into the SM 114 and writes writing data received externally into the CM 113. On the other hand, the DKA 112 monitors the SM 114, and when it detects that a writing request is written in the SM 114, it reads writing data from the CM 113 according to the writing request and write the writing data into a region on the target HDD 131. The reading processing is performed in the following manner. When any CHA 111 receives a data-reading request from the external apparatus, the CHA 111 examines whether or not data to be read out is present in the CM 113. When data to be read is present, the CHA 111 reads the data to transmit the same to the external apparatus (respond to the external apparatus). On the other hand, when data to be read is not present, the CHA 111 writes the reading request into the SM 114 and monitors the SM 114. The DKA 112 detects that the reading request is written in the SM 114. The DKA 112 reads target data from a region in a target HDD 131 to write the same into the CM 113, and along with that, writes such a fact into the SM 114. When the CHA 111 detects that data to be read is written in the CM 113, it reads the data to transmit the same to the external apparatus (respond to the external apparatus).

Note that, a configuration for controlling respective means such as the CHA 111 centering the CPU, a configuration for issuing a processing instruction or performing data transfer between the CHA 111 and the DKA 112 directly, a configuration where functions of the CHA 111 and the DKA 112, and the like are unified may be adopted as other configurations for the DKC 110.

<Index Information>

In FIG. 7A to FIG. 7C, configuration examples in a table format of index information 300 (including de-duplicate group information (C2)) in the first embodiment are shown (FIG. 7D shows a conventional configuration example). The examples correspond to the example shown in FIG. 2. Metadata 310 of a file in FIG. 7A has a file ID 311, file name (including pass and the like) 312, and de-duplicate group information (C2) 602. The metadata has a configuration wherein the de-duplicate group information (C2) 602 is added to the conventional metadata (only the file ID 311 and the file name 312 are shown for simplification). The de-duplicate group information (C2) 602 has a representative file flag 51, and a next file ID 52 (RN_FID). The representative file flag 51 is a flag for showing whether or not this file is a representative file. The next file ID 52 is a file ID showing the next file in a ring configuration (corresponding to the link between de-duplicate files) in the same de-duplicate group. Keyword information 320 shown in FIG. 7B has the same configuration as the conventional one, and it has a keyword 321, and occurrence position information ID (abbreviated as LID) 322. Occurrence position information 330 shown in FIG. 7C has the same configuration as the conventional one, and it has occurrence position information ID (LID) 331, next LID (LID of the next occurrence position) 332, file ID (file ID of an occurrence position) 333, and occurrence position information 334. The occurrence position information 334 is occurrence positions of a keyword in the file. In the conventional configuration, for example, in addition to a record of the occurrence position information 330 regarding a file (F1) whose file ID is FID1, a record (for example, "IDX12, IDX13, FID2, 10, 24") of the occurrence position information 330 regarding a file (F2) which has the same content as that of the file (F1) whose file ID is FID2 is stored. However, in the configuration (FIG. 7C) of the embodiment, the record is not stored due to the de-duplicate.

<Example of Search-Target File Group>

In FIG. 8, an example of a search (analysis)-target file group 700 is shown. For simplification, this example is an example that, in three files F1 (file1), F2 (file2), and F3 (file3) (where respective file IDs are FID1, FID2, and FID3), F1 and F2 have the same content and include a keyword "apple," while F3 is an independent file and includes keywords "apple" and "orange."

<De-Duplicate Information (C1)>

In FIG. 9, a configuration example of the de-duplicate information (C1) 601 is shown. The de-duplicate information (C1) 601 has a file name 81 and a file name 82 of a representative file. A file having the same content (for example, F2) is caused to correspond to a representative file (for example, F1). An independent file (for example, F3) is a representative file itself. Incidentally, the file name 81 does not include a name of own apparatus (NAS 101) (it may include the name).

<Signature Hash>

In FIG. 10, a configuration example of the signature hash 603 information is shown. The signature hash 603 has a signature 61 and a list 62 of file names of files having the same signature 61. In the present system, a processing of signature hash, which is a known technique, is used to narrow the comparison target for determining whether or not the contents of the file group are the same. Thereby, the processing can be faster. Regarding the information of the signature hash 603, only representative files (for example, F1, F3) are registered. That is, in the processing of each file, when a file (for example, F1) having the same signature 61 and the same content is already registered, a file (for example, F2) under processing is not registered. In order to re-use information of the signature hash 603 for re-analysis and the like, it is necessary to perform detection of such a fact that date of update of a file has not been updated and detection of such a fact that the file is a WORM (write once read many: unrewritable) file. However, these extended processings are obvious and explanation thereof is omitted.

<Search Result>

In FIG. 11, a configuration example of result of a search processing in a state that the index information 300 is de-duplicated is shown. The example is a result obtained by an instruction from the host apparatus 400 designating a condition that "apple" is included but "orange" is not included as a keyword to perform full-text search (that is, a keyword search on the index information 300) on a search-target file group 700. In FIG. 11A, a result (search result information 900) of a search processing in an ordinary configuration which does not include the de-duplicate correspondence processing unit 502 is shown. In FIG. 11B, a result (search result information 900) of a search processing performed by the de-duplicate correspondence search processing 15 in a configuration including the de-duplicate correspondence processing unit 502, namely, a desirable search result reflecting a current status of the file group is shown. In FIG. 11A, only information (a record of the occurrence position information 330) regarding the file F1 (representative file) of FID1 where the index information 300 is directly stored is outputted while information of the file F2 having the same content as that of the file F1 is not outputted. The record of the occurrence position information 330 in the search result information 900 has LID 91, next LID 92, file ID 93, and occurrence position information 94. On the other hand, in FIG. 11B, besides information regarding the file F1 (representative file) of FID1, information of the file F2 of FID2 having the same content as the F1 belonging to the same de-duplicate group is added.

<Display Example of Search Result>

In FIG. 12, a display example of the abovementioned search result on the host apparatus 400 side is shown. This display example is an example where the abovementioned search result (FIG. 11B) is displayed on a screen of the host apparatus 400 in a form of, for example, a Web page or the like based on the search result information 900 in the present system. FIG. 12A is an example where files having the same content (example: F1, F2) are displayed as different information units. FIG. 12B is an example where file names of files having the same content are collectively displayed as one information unit as a list. Thick/italic letters indicate a keyword found in the file. An underlined file name is a link to the file body, so that when the underlined portion is clicked by a user of the host apparatus 400, the file can be read from the NAS 101 (incidentally, the server name of NAS 101 is defined as "nas1") and displayed.

Other Configuration Examples

There are the following configurations as other configurations of the first embodiment. In the present example, the NAS 101 and the storage apparatus 103 are provided as different apparatuses, but they may be configured as one apparatus by incorporating the NAS 101 or the de-duplicate processing unit 501 into the storage apparatus 103. In addition, the function of the full-text search server 102 may be configured as one apparatus by providing the function in the NAS 101 or the storage apparatus 103. The index information 300 may be stored in the full-text search server 102 or it may be stored in another external storage apparatus or the like.

Further, in the present example, a case where the state of the search-target file group 700 is not updated at a full-text search processing (index creation processing) time is explained for simplification. Processings in a similar manner as the conventional full-text search processing and the like are performed in: a case that a file is added to the search-target file group 700 afterwards; a case that the content of a stored file is rewritten and updated; and another case. Alternatively, a configuration for limiting files to be applied to perform a characteristic processing (deletion of index information by de-duplicate) may be adopted.

Further more, in the present example, the de-duplicate information (C1) 601 is acquired according to access from the full-text search server 102 to the NAS 101. Besides, such a configuration that, at timing such as that at which a file is written from an external apparatus (a host apparatus 400), the NAS 101 positively reports or transmits the according fact, the file, or the de-duplicate information (C1) 601 and the like to the full-text search server 102 and the full-text search server 102 accordingly performs a processing thereto may be adopted.

Second Embodiment

Next, a storage system according to a second embodiment of the present invention will be explained with reference to FIG. 13 to FIG. 15, and the like. According to the abovementioned outline configuration, the second embodiment has a configuration where the full-text search server is provided with the de-duplicate function and the de-duplicate correspondence processing unit in the configuration that the NAS without de-duplicate function and the storage apparatus are provided.

<System (2)>

Figure 13:
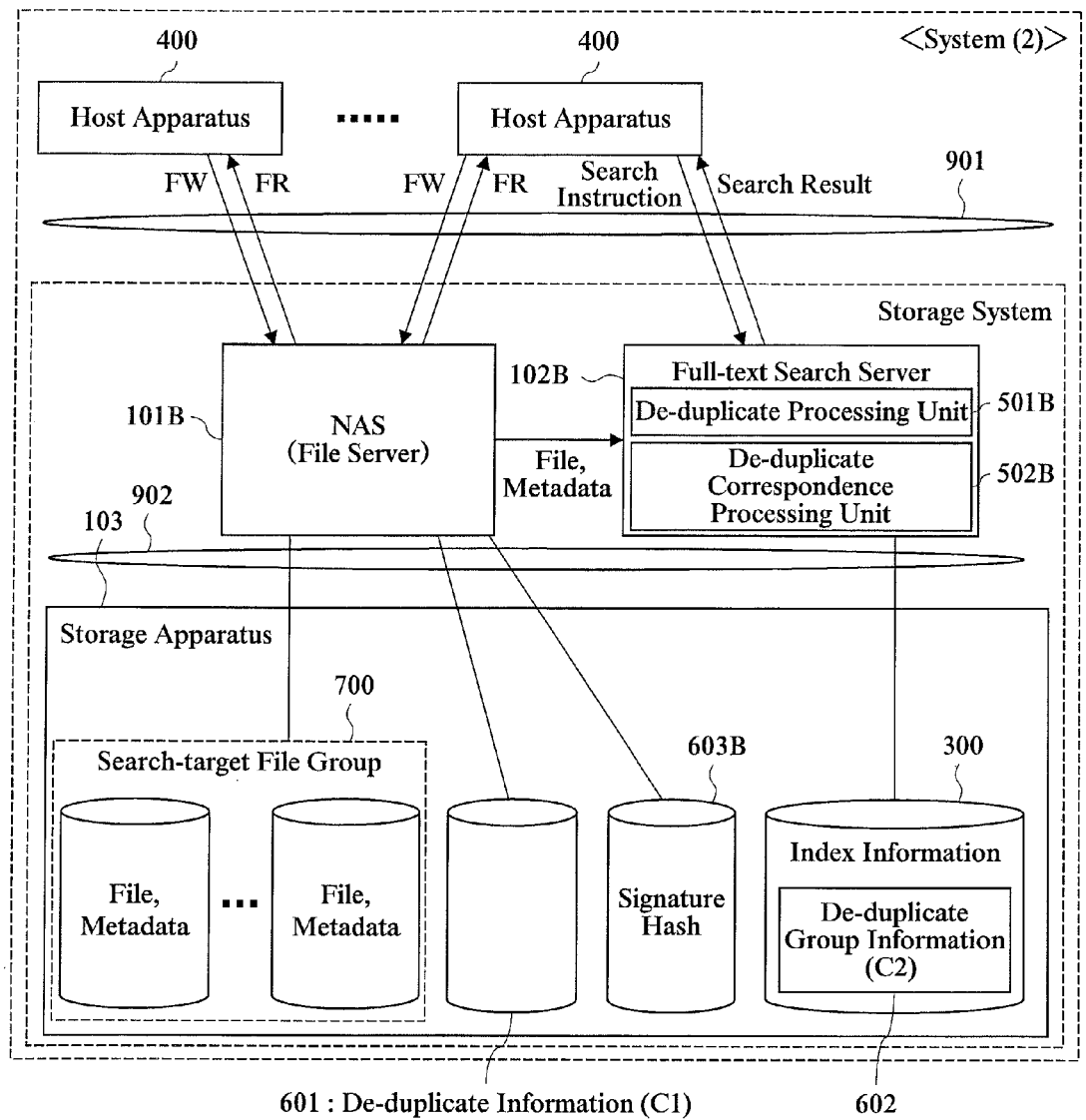
FIG. 13 is a diagram showing a configuration of a storage system in a second embodiment of the present invention.

In FIG. 13, the configuration of a storage system according to the second embodiment is shown. The present storage system has a NAS (a file server) 101B, a full-text search server 102B, and the storage apparatus 103. FIG. 14 shows particulars of the full-text search server 102B and a de-duplicate correspondence processing unit 502B. FIG. 15 shows particulars of a signature hash 603B.

The full-text search server 102B performs not only a full-text search processing but also a de-duplicate processing in the de-duplicate processing unit 501B. And corresponding to this, it also performs a search processing corresponding to de-duplicate performed by the de-duplicate correspondence processing unit. Further, the full-text search server 102B manages the de-duplicate information (C1) 601 and the signature hash 603B for the de-duplicate processing.

<Full-Text Search Server and De-Duplicate Correspondence Function (2)>

Figures 14, 15:
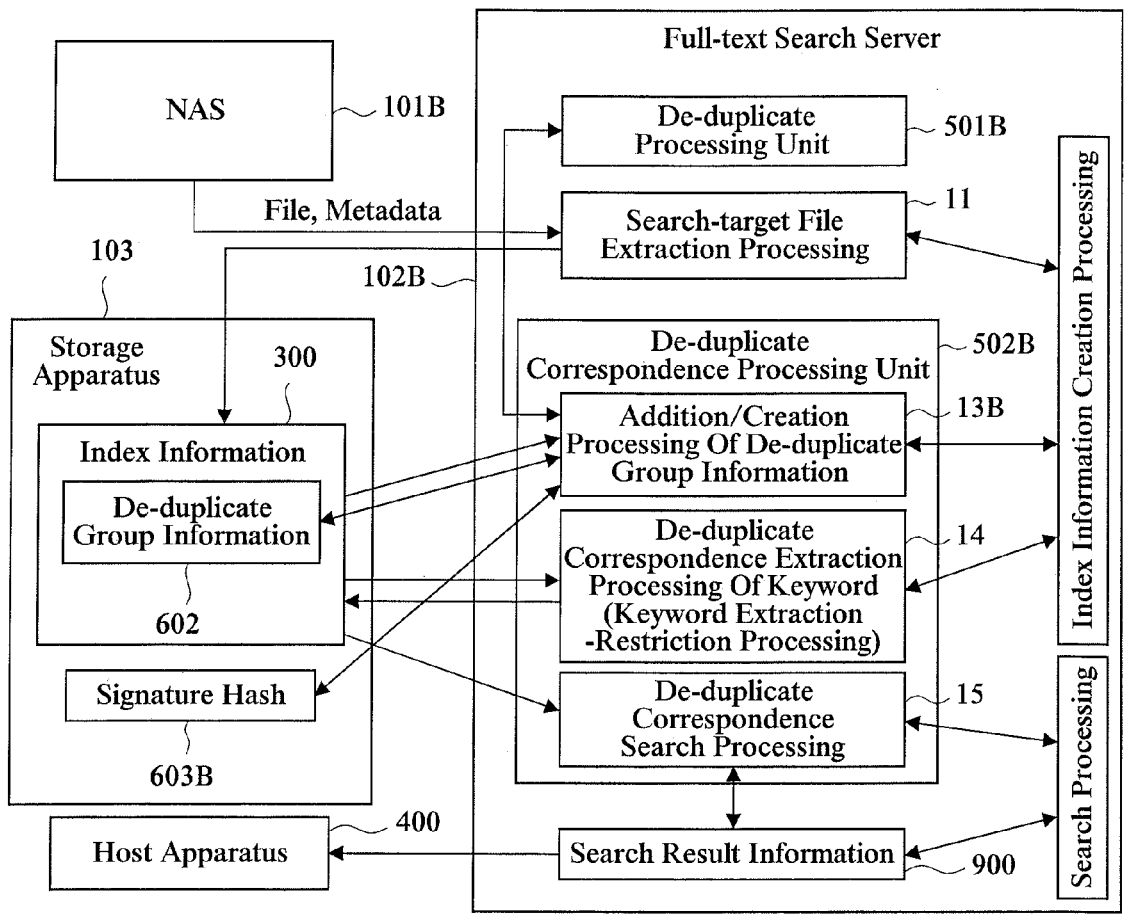
FIG. 14 is a diagram showing a detailed configuration of a full-text search server and a de-duplicate correspondence processing unit in the storage system in the second embodiment of the present invention.
FIG. 15 is a diagram showing a configuration example of a signature hash in the storage system in the second embodiment of the present invention.
Figure 22:
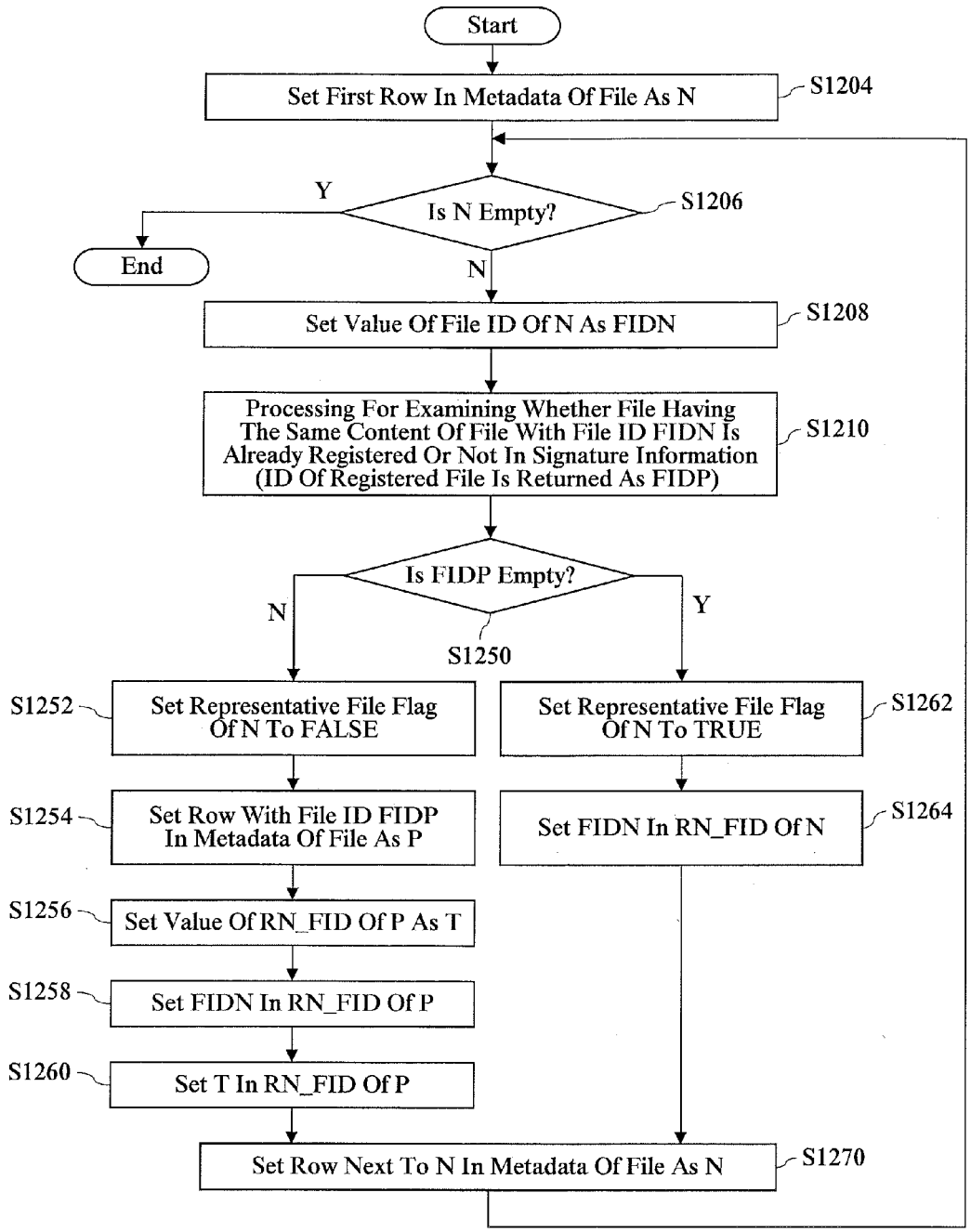
FIG. 22 is a flowchart of a creation processing of de-duplicate group information in the storage system in the second embodiment of the present invention.

In FIG. 14, particulars of the full-text search server 102B and the de-duplicate correspondence processing unit 502B are shown. A de-duplicate group information addition/creation processing 13B (whose particulars are shown in FIG. 22) is a novel processing performed by the de-duplicate processing unit 501B. Processing contents of respective portions are similar to those in the first embodiment.

<Signature Hash (2)>

In FIG. 15, the signature hash 603B is shown. The signature hash 603B has a signature 61B and a list 62B of file IDs of files having the same signature. Only information about the representative file is registered in information of the signature hash 603B. That is, when a file having the same signature 61B and having the same content (example: F1) is already registered in a processing for each file, a file (example: F2) during processing is not registered. In this case, a representative file flag to a file put during processing in the de-duplicate group information (C2) 602 is set as FALSE, and the file put during processing is added to a ring in the same de-duplicate group to which the registered representative file belongs. Specifically, when "next file ID of a ring in the same de-duplicate group" of a representative file is represented as "P. next," and a file during processing of "next file ID of a ring in the same de-duplicate group" is represented as "C. next," the following processing: "tmp (temporary variable)=P. next; P. next="file ID of a file during processing; C. next=temp" is performed. When a file having the same content is not registered, a representative file flag to a file during processing of the de-duplicate group information (C2) 602 is determined as TRUE, and the next file ID of the ring in the same de-duplicate group to which the already registered representative file belongs is determined as file ID of a file during processing itself.

<Processing Flow>

Next, processing flows of respective portions in the respective embodiments described above will be explained with reference to FIG. 16 to FIG. 23.

<De-Duplicate Processing>

Figure 17:
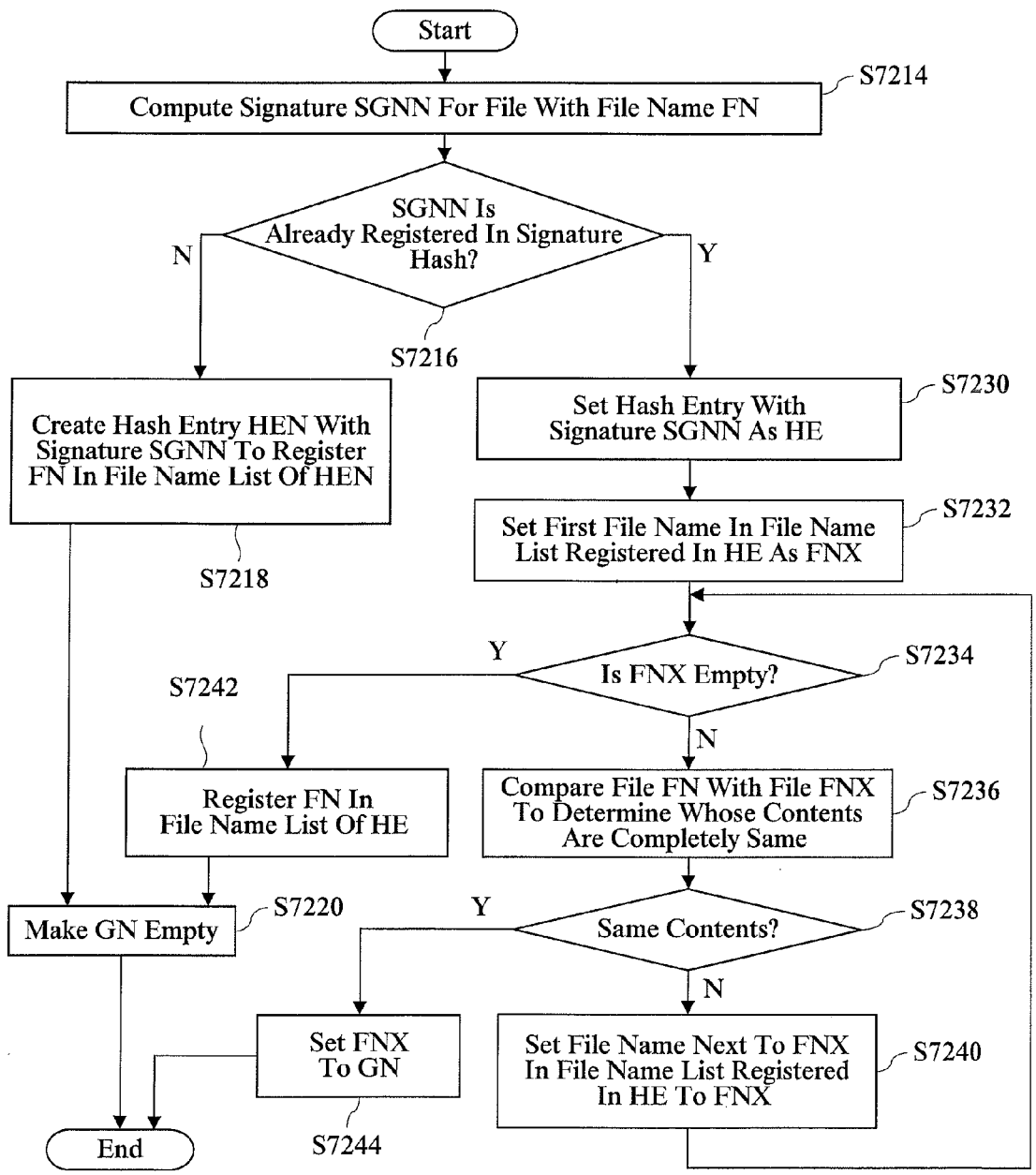
FIG. 17 is a flowchart of a same content file determination (S7210) in the de-duplicate processing in the storage systems in the first and second embodiments of the present invention.

In FIG. 16, a flow of a de-duplicate processing performed by the de-duplicate processing unit 501 is shown ("S" indicates a processing step). After the de-duplicate processing is started, the name of the first file in a search-target file group 700 is set as FN (S7204). Next, determination is made about whether or not FN is empty (S7206), and when FN is empty (Y), this processing is terminated. When the FN is not empty (N), examination is made about whether or not a file having the same content as that of a file whose file name is FN is already registered in the information of the signature hash 603 (S7210). The particulars of this processing (same content file determination) are shown in FIG. 17. According to this processing, the file name of the registered file is returned as GN.

Next, determination is made about whether or not GN is empty (S7250), and when GN is empty (Y), FN is set to GN (S7254). When GN is not empty (N), body of the file whose file name is FN is deleted and setting is performed such that the body of the file whose file name is FN indicates the body of the file whose file name is GN (S7252). Next, a set of FN and GN is registered in the de-duplicate information (C1) 601. Next, a name of a file next to "F" in the search-target file group 700 is set as "F" (S7258). Then, the processing returns to the step S7206.

<Same Content File Determination (1)>

In FIG. 17, a flow of the processing of the above-mentioned step S7210 is shown. First, signature SGNN for the file whose file name is FN is computed (S7214). Next, determination is made about whether or not the signature SGNN is already registered in the information of signature hash 603 (S7216). When the determination is negative (N), hash entry HEN whose signature is SGNN is created and FN is registered in a file name list of HEN (S7218). Then, GN is made empty (S7220) and the processing is terminated. When the determination is affirmative (SGNN is registered) (Y), hash entry whose signature is SGNN is set as HE (S7230). Next, a first file name in the file name list registered in HE is set as FNX (S7232). Next, determination is made about whether or not FNX is empty (S7234), and when FNX is empty (Y), FN is registered in the file name list of HE (S7242). Then, GN is made empty (S7220) and the processing is terminated. When FNX is not empty (N), comparison about whether the contents of the file FN and the file FNX are completely the same is made (S2736). When the result of the comparison tells that their contents are the same (S7238-Yes), GNX is set as GN (S7244), and the processing is terminated. When the result tells that their contents are not the same (S7238-No), a file name next to the FNX in the file name list registered in HE is set as FNX (S7240), and the processing returns to the step S7234.

<Search-Target File Extraction Processing>

Figure 18:
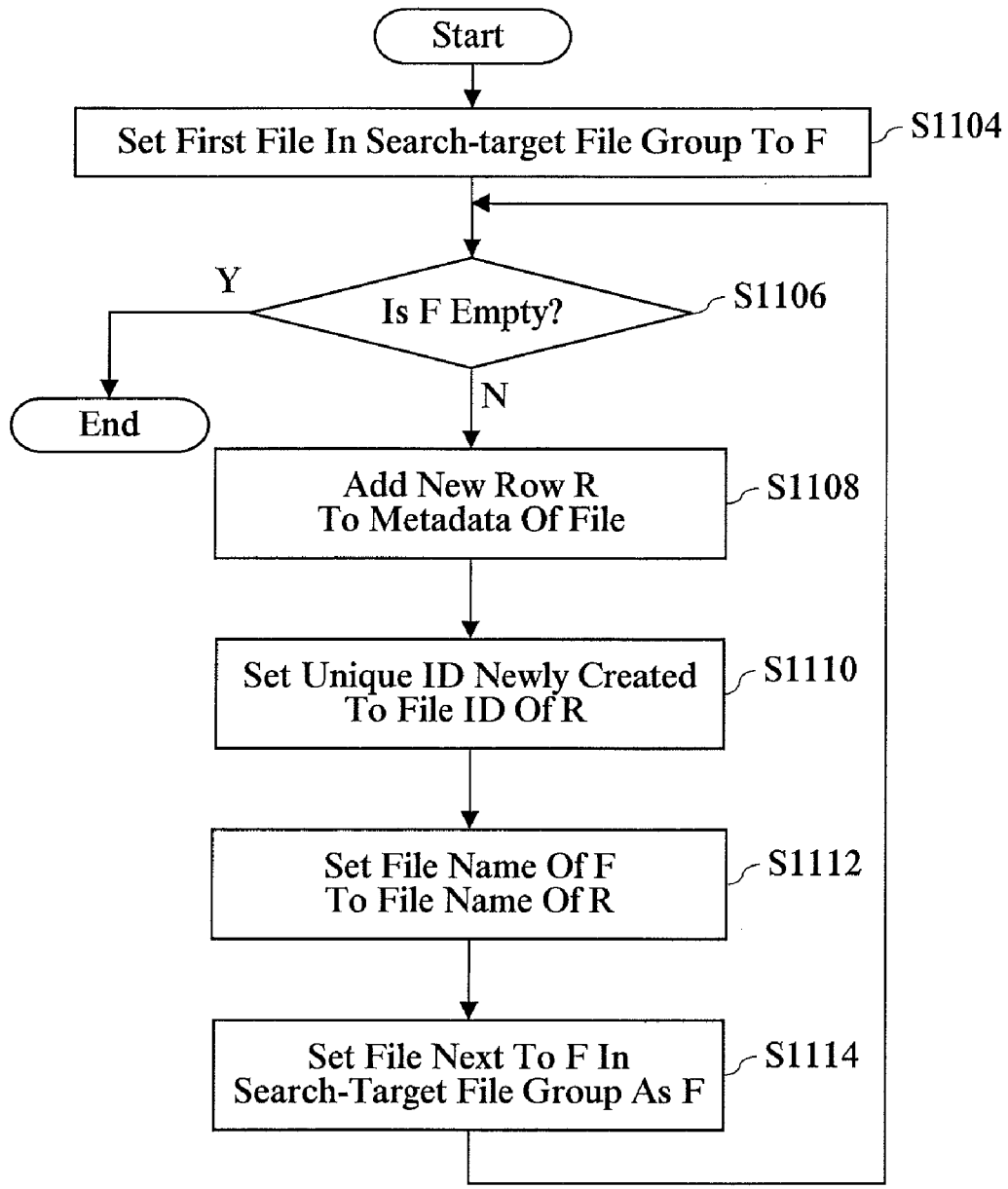
FIG. 18 is a flowchart of an extraction processing of search-target file in the storage systems in the first and second embodiments of the present invention.

In FIG. 18, the extraction processing of search-target file 11 performed by the full-text search server 102 is shown. First, the first file in the search-target file group 700 is set as "F" (S1104). Next, determination is made about whether or not "F" is empty (S1106). When F is empty (Y), the processing is terminated. When F is not empty (N), a new row (record) "R" is added to the metadata of the file (S1108). Next, a unique ID newly created is set to a file ID of R (S1110). Next, the file name of F is set as the file name of R (S1112). Next, a file next to F in the search-target file group 700 is set as F to (S1114) and the processing returns to the step S1106.

<Creation Processing of De-Duplicate Group Information (1)>

Figure 19:
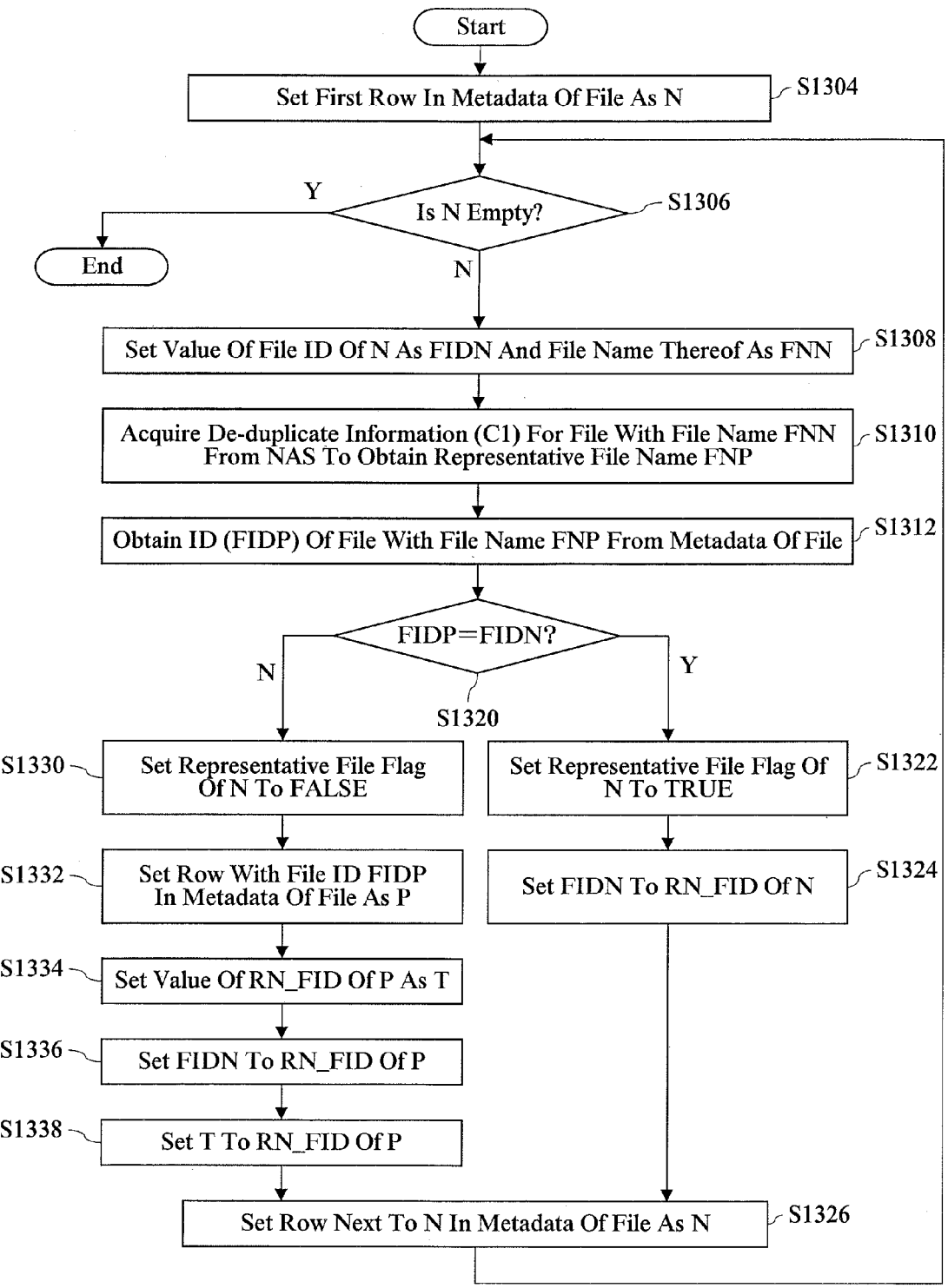
FIG. 19 is a flowchart of a creation processing of de-duplicate group information in the storage system in the first embodiment of the present invention.

In FIG. 19, a de-duplicate group information addition/creation processing 13 (an example corresponding to the first embodiment) is shown. First, a first row in the metadata of a file is set as N (S1304). Next, determination is made about whether or not N is empty (S1306), and when N is empty (Y), the processing is terminated. When N is not empty (N), a value of file ID of N is set as FIDN and a file name is set as FNN (S1308). Next, de-duplicate information (C1) 601 to a file whose file name is FNN is acquired from the NAS 101 and a file name FNP of a representative file is obtained (S1310). Next, ID (FIDP) of a file whose file name is FNP is obtained from the metadata of the file (S1312). Next, determination is made about whether or not FIDP is the same as FIDN (S1320), and when FIDP and FIND are the same (Y), a representative file flag of N is set to TRUE (S1322) and FIDN is set to RN_FID (S1324). A row next to N in the metadata of the file is set as N (S1326) and the processing returns to the step S1306. When FIDP and FIND are not the same in the step S1320 (N), the representative file flag is set as FALSE (S1330). Next, a row whose file ID is FIDP in the metadata of the file is set as P (S1332), a value of RN_FID of P is set as T (S1334), FIDN is set to RN_FID of P (S1336), and T is set to RN_FID of P (S1338). A row next to N in the metadata of the file is set as N (S1326) and the processing returns to the step S1306.

<De-Duplicate Correspondence Keyword Extraction Processing>

Figure 20:
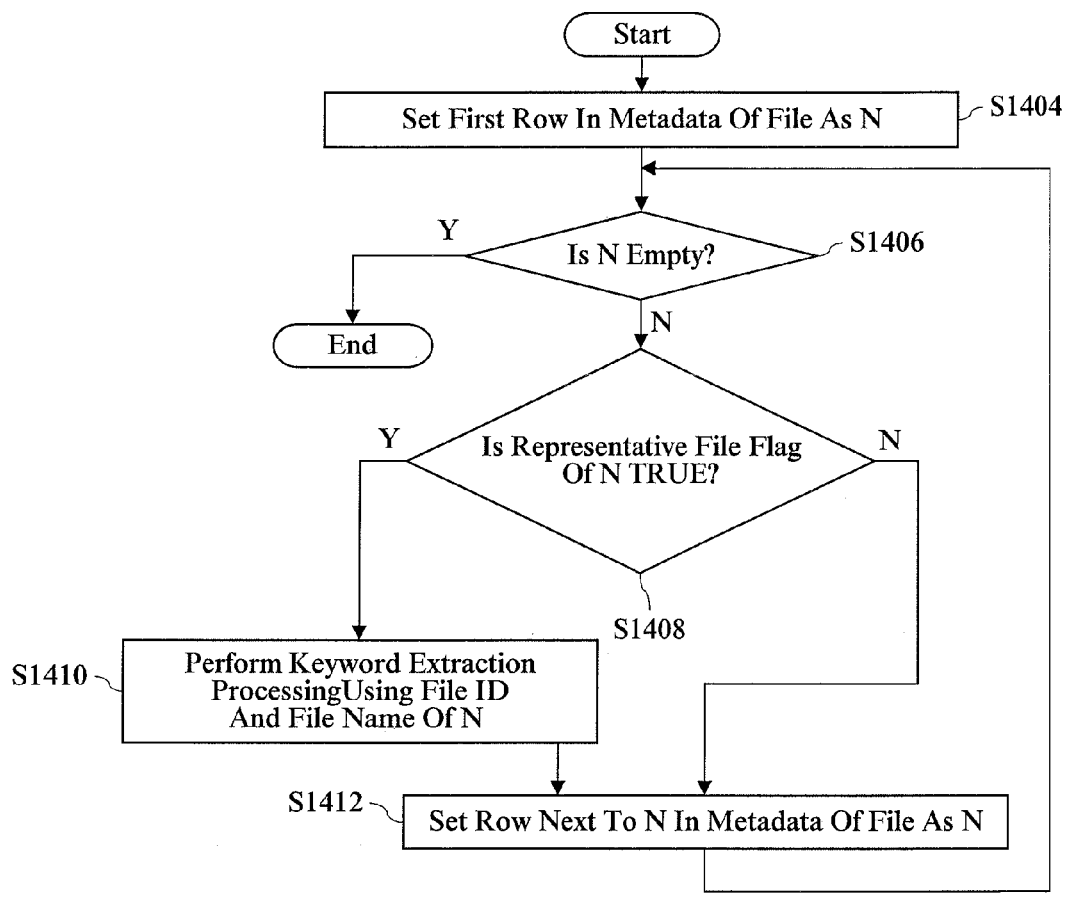
FIG. 20 is a flowchart of an extraction processing of de-duplicate correspondence keyword in the storage systems in the first and second embodiments of the present invention.

In FIG. 20, the de-duplicate correspondence keyword processing 14 is shown. First, the first row in the metadata of the file is set as N (S1404). Determination is made about whether or not N is empty (S1406), and when N is empty (Y), the processing is terminated. When N is not empty (N), determination is made about whether or not a representative file flag of N is TRUE (S1408), and when the determination is affirmative (Y), a keyword extraction processing is performed using the file ID and the file name of N (S1410). A row next to N in the metadata of the file is set as N (S1412), and the processing returns back to step S1406. When the determination is negative (N), the processing returns back to step S1406 after the processing at S1412.

<De-Duplicate Correspondence Search Processing>

Figure 21:
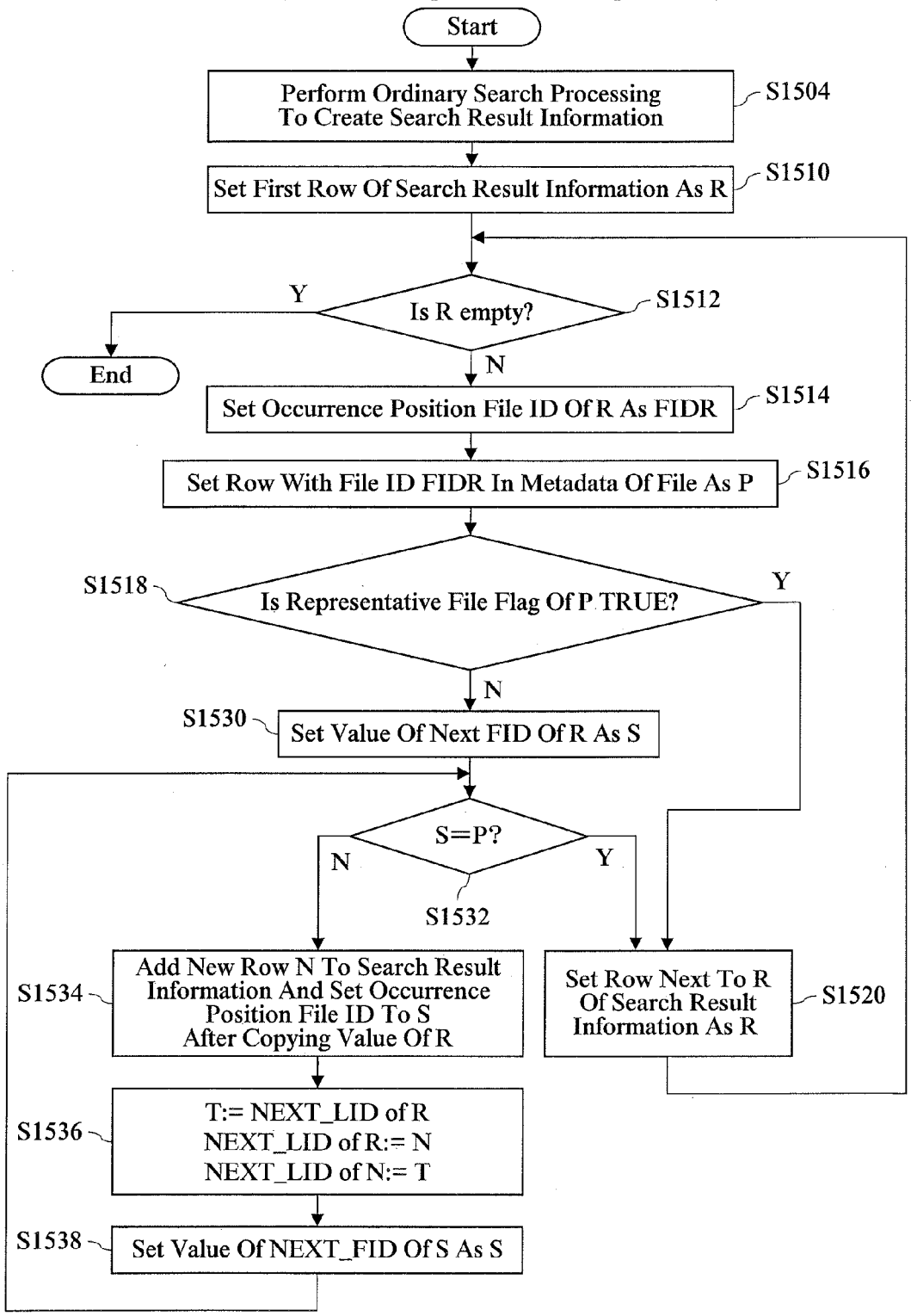
FIG. 21 is a flowchart of a de-duplicate correspondence search processing in the storage systems in the first and second embodiments of the present invention.

In FIG. 21, the de-duplicate correspondence search processing 15 is shown. First, a normal search processing (FIG.

11A) is performed to create search result information 900 (S1504). Next, the first row of the search result information 900 is set as R (S1510). Next, determination is made about whether or not R is empty (S1512), and when R is empty (Y), the processing is terminated. When R is not empty (N), an occurrence position file ID of R is set as FIDR (S1514). Next, a row whose file ID is FIDR in the metadata of the file is set as P (S1516). Next, determination is made about whether or not the representative file flag of P is TRUE (S1518), and when the representative file flag of P is TRUE (Y), a row next to R of the search result information 900 is set as R (S1520), and the processing returns back to step S1512. When the representative file flag of P is not TRUE (N), a value of FID next to R is set to S (S1530). Next, determination is made about whether or not S=P is satisfied (S1532), and when S=P is satisfied (Y), the processing returns back to step S1512 after the processing at the step S1520. When S=P is not satisfied (N), a new row N is added to the search result information 900, and S is set in the occurrence position file ID after a value of R is copied (S1534). Next, the next LID (NEXT_LID) is assigned to T, N is assigned to the next LID (NEXT_LID) of R, and T is assigned to the next LID (NEXT_LID) (S1536) of N. Next, a value of the next FID (NEXT_FID) of S is set as S (S1538), and the processing returns back to step S1532.

<De-Duplicate Group Information Creation Processing (2)>

Next, in FIG. 22, the de-duplicate group information addition/creation processing 13 (an example corresponding to the second embodiment) is shown. First, the first row in the metadata of a file is set as N (S1204). Next, determination is made about whether or not N is empty (S1206), and when N is empty (Y), the processing is terminated. When N is not empty (N), a value of the file ID of N is then set as FIDN (S1208). Next, a processing for examining whether or not a file having the same content as that of the file whose file ID is FIDN has been already registered in the signature information (S1210). The ID of the registered file is returned back as FIDP. Next, determination is made about whether or not FIDP is empty (S1250), and when FIDP is not empty (N), a representative file flag of N is set as FALSE (S1252), and a row whose file ID in the metadata of the file is FIDP is set as P (S1254). Next, a value of RN_FID of P is set as T (S1256), FIDN is set in RN_FID of P (S1258), and T is set to RN_FID of P (S1260). A row next to N in the metadata of the file is set as N (S1270), and the processing returns back to step S1206. When FIDP is empty (Y) at step S1250, a representative file flag of N is set as TRUE (S1262). Next, FIDN is set in RN_FID of N (S1264). A row next to N in the metadata of the file is set as N (S1270), and the processing returns back to step S1206.

<Same Content File Determination (2)>

Figure 23:
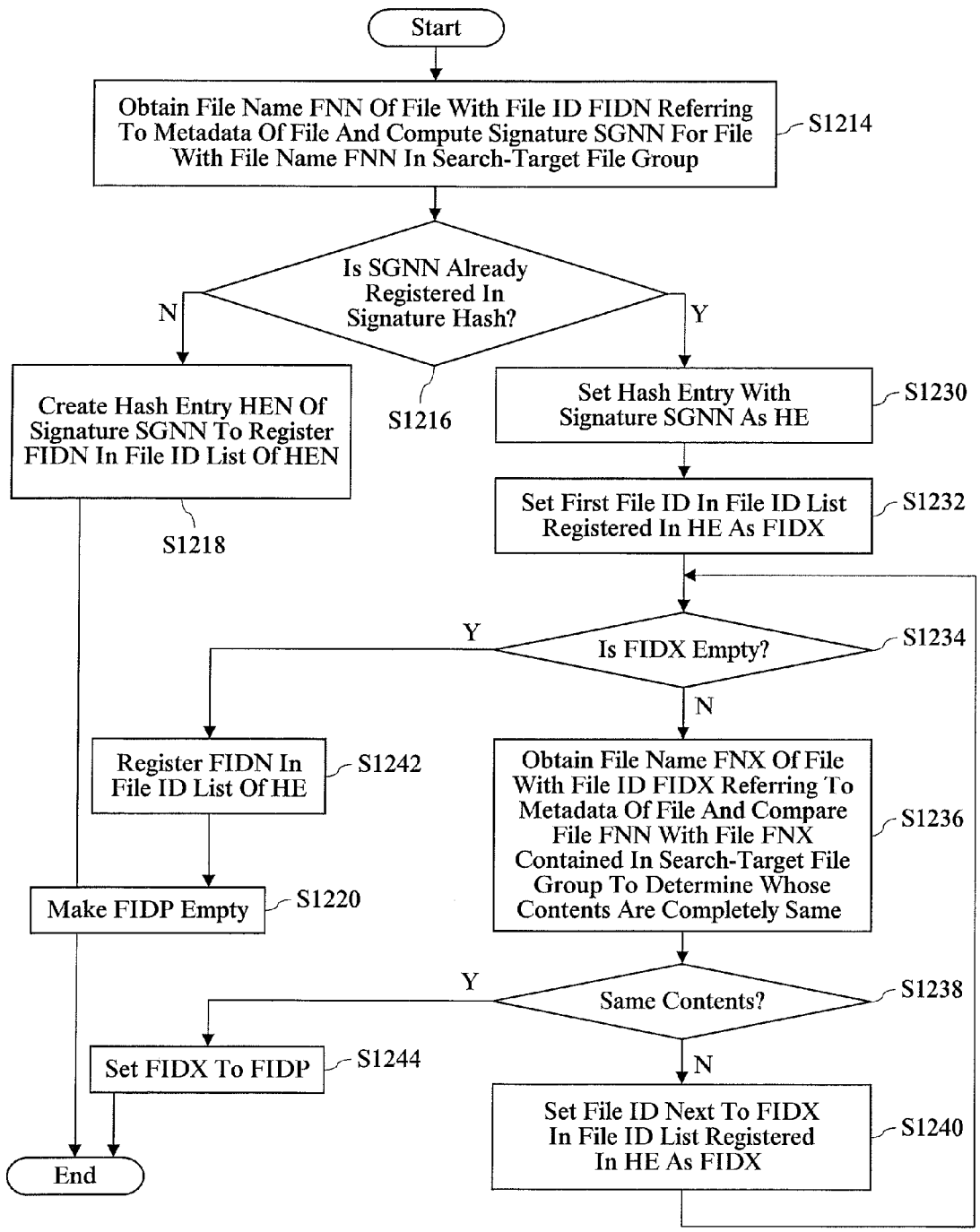
FIG. 23 is a flowchart of a same content file determination (S1210) in the creation processing of de-duplicate group information in the storage system in the second embodiment of the present invention.

In FIG. 23, a flow of the processing at step S1210 is shown. First, referring to the metadata of a file, file name FNN of a file whose file ID is FIDN is obtained and signature SGNN to a file whose file name is FNN in the search-target file group is calculated (S1214). Next, determination is made about whether or not the signature SGNN is already registered in the signature hash 603 (S1216). When SGNN is not registered (N), hash entry HEN whose signature is SGNN is created and FIDN is registered in the file ID list of HEN (S1218). FIDP is made empty (S1220) and the processing is terminated. When SGNN is already registered (Y), hash entry whose signature is SGNN is set as HE (S1230). Next, the first file ID in the file ID list registered in HE is set as FIDX (S1232). Next, determination is made about whether or not FIDX is empty (S1234), and when FIDX is empty (Y), FIDN is registered in the file ID list of HE (S1242). FIDP is made empty (1220), and the processing is terminated. When FIDX is not empty (N), file name FNX of a file whose file ID is FIDX is obtained referring to metadata of the file and comparison is made about whether contents of the file FNN and the file FNX contained in the search-target file group are completely the same is made (S1236). When their contents are the same (S1238-Y), FIDX is set in FIDP (S1244), and the processing is terminated. When their contents are not the same (S1238-N), file ID next to FIDX in the file ID list registered in HE is set as FIDX (S1240), and the processing returns back to step S1234.

As explained above, according to respective embodiments, especially, (1) the amount of the index information 300 managed and reserved by the full-text search server 200 can be reduced. (2) File reading of a same content file is made unnecessary and reduction of the processing of input/output can be achieved. (3) A creation time of the index information 300 in the full-text search server 200 can be reduced.

In the foregoing, the invention made by the inventor of the present invention has been concretely described based on the embodiments. However, it is needless to say that the present invention is not limited to the foregoing embodiments and various modifications and alternation can be made within the scope of the present invention.

The present invention can be applied to an information processing system such as a storage system or a full-text search system.

What I claim is:

1. A storage system which stores files of data inputted in/outputted from a host apparatus in a storage area, comprising:
a file server apparatus which includes a de-duplicate processing unit which performs de-duplicate processing to a plurality of files having the same content in a file group stored in the storage area and which creates de-duplication information which is stored in the storage area, and which comprises control information indicating a de-duplicate status of the file server apparatus including presence/absence of files having the same content and information of a representative file in the storage area; and
a full-text search processing apparatus which performs a full-text search processing including an index information creation processing to the file group stored in the storage area to create index information and which performs a de-duplicate group information creation processing to create de-duplicate group information based on said de-duplication information, wherein the de-duplicate group information indicates a group of files having the same content, representative files in the group of files and a link between the files,
wherein the index information includes keyword occurrence position information in a data body of the file and further includes said de-duplicate group information,
wherein the index information is de-duplicated by inhibiting the keyword occurrence position information creation processing performed to the plurality of files having the same content by the full-text search processing apparatus according to a status of the de-duplicate processing to the file group performed by the de-duplicate processing unit of the file server apparatus,
wherein the full-text search processing apparatus executes de-duplicate correspondence processing based on the index information,
wherein, said full-text search server apparatus responds to the host apparatus by providing search result information comprising information regarding a representative file included in a search result, and further provides, by referring to said de-duplicate group information, information of another file which belongs to a de-duplicate group of the representative file and which has the same content as said representative file, said representative file being searched by said de-duplicate correspondence processing, and wherein the de-duplicate correspondence processing performed by the full text search processing apparatus is a separate function from the de-duplicate processing performed by the de-duplicate processing unit of the file server apparatus, and wherein the de-duplicate correspondence processing performed by the full text search processing apparatus is controlled by the de-duplicate information created by the de-duplicate processing unit of the file server apparatus.

2. A storage system which stores files of data inputted in/outputted from a host apparatus in a storage area, comprising:

a first storage apparatus which is connected to the host apparatus via a network and receives input/output of the files from the host apparatus;

a second storage apparatus which is connected to the first storage apparatus and stores the files in a storage area of the second storage apparatus itself according to access from the first storage apparatus, wherein the first storage apparatus includes a file server apparatus including a de-duplicate processing unit which performs a processing for de-duplicating a plurality of files having the same content regarding a file group stored in the storage area of the second storage apparatus and which creates de-duplication information which is stored in the storage area, and which comprises control information indicating a de-duplicate status of the file server apparatus including presence/absence of files having the same content and information of a representative file in the storage area; and a full-text search server apparatus which performs a full-text search processing including an index information creation processing to a file group stored in the storage area of the second storage apparatus to create index information, which performs a search processing for performing a keyword search for the index information in response to an instruction from the host apparatus to return search result information back to the host apparatus, and which performs a de-duplicate group information creation processing to create de-duplicate group information based on said de-duplication information, wherein the de-duplicate group information indicates a group of files having the same content, representative files in the group of files and a link between the files, wherein the index information includes keyword occurrence position information in a data body of the file and further includes said de-duplicate group information, wherein the full-text search server apparatus inhibits the keyword occurrence position information creation processing to a plurality of files having the same content according to a status of the de-duplicate processing of the file group performed by the de-duplicate processing unit of the file server apparatus, except for a representative file, wherein the full-text search server apparatus executes de-duplicate correspondence processing based on the index information, wherein, said full-text search server apparatus responds to the host apparatus by providing search result information comprising information regarding a representative file included in a search result, and further provides, by referring to said de-duplicate group information, information of another file which belongs to a de-duplicate group of the representative file and which has the same content as said representative file, said representative file being searched by said de-duplicate correspondence processing, and wherein the de-duplicate correspondence processing performed by the full text search processing apparatus is a separate function from the de-duplicate processing performed by the de-duplicate processing unit of the file server apparatus, and wherein the de-duplicate correspondence processing performed by the full text search processing apparatus is controlled by the de-duplicate information created by the de-duplicate processing unit of the file server apparatus.

3. The storage system according to claim 2, wherein the first storage apparatus performs a processing for supplying first information indicating a status of the de-duplicate processing of the file performed by the de-duplicate processing unit to the outside, the full-text search server apparatus uses the first information acquired from the first storage apparatus to create and manage second information indicating a group of files having the same content in a file group to be subjected to a full-text search processing and a representative file therein, and the full-text search server apparatus uses the second information to determine and detect whether or not target files read from the storage area of the first or second storage apparatus are files having the same content and representative files and inhibits keyword extraction processing to the files having the same content as those of the representative files.

4. A method of operating a storage system which stores files of data inputted in/outputted from a host apparatus in a storage area, the storage system including a first storage apparatus which is connected to the host apparatus via a network and receives input/output of the files from the host apparatus, a second storage apparatus which is connected to the first storage apparatus and stores the files in a storage area of the second storage apparatus itself according to access from the first storage apparatus, wherein the first storage apparatus includes a file server apparatus including a de-duplicate processing unit, and a full-text search server apparatus, the method comprising:

performing a processing with the file server apparatus for unifying a plurality of files having the same content to a single instance regarding a file group stored in the storage area of the second storage apparatus and which creates de-duplication information which is stored in the storage area, and which comprises control information indicating a de-duplicate status of the file server apparatus including presence/absence of files having the same content and information of a representative file in the storage area, performing, with the full-text search server apparatus a full-text search processing including an index information creation processing to a file group stored in the storage area of the second storage apparatus to create index information, and which performs a search processing for performing a keyword search for the index information in response to an instruction from the host apparatus to return a search result information back to the host apparatus, and which performs a de-duplicate group information creation processing to create de-duplicate group information based on said de-duplication information, wherein the de-duplicate group information indicates a group of files having the same content, representative files in the group of files and a link between the files, wherein the index information includes a keyword occurrence position in a data body of the file, and further includes said de-duplicate group information, inhibiting, with the full-text search server apparatus, the keyword occurrence position information creation processing regarding a plurality of files having the same content according to a status of the unification of the file group to the single instance performed by the de-duplicate processing unit of the file server apparatus except for a representative file, executing, with the full-text search server apparatus, de-duplicate correspondence processing based on the index information, and responding, with said full-text search server apparatus, to the host apparatus by providing search result information comprising information regarding the representative file included in a search result and further providing, by referring to said de-duplicate group information, information of another file which belongs to a de-duplicate group of the representative file and which has the same content as said representative file, and wherein the de-duplicate correspondence processing performed by the full text search processing apparatus is a separate function from the de-duplicate processing performed by the de-duplicate processing unit of the file server apparatus, and wherein the de-duplicate correspondence processing performed by the full text search processing apparatus is controlled by the de-duplicate information created by the de-duplicate processing unit of the file server apparatus.

5. The method according to claim 4, wherein the full-text search server apparatus uses first information indicating a status of the de-duplicate processing of the file performed by the de-duplicate processing unit to create and manage second information indicating a group of files having the same content in the file group to be subjected to a full-text search processing and a representative file in the files, and the full-text search server apparatus uses the second information to determine and detect whether or not target files read from the storage area of the first or second storage apparatus are files having the same content and representative files and inhibits keyword extraction processing to the files having the same content as those of the representative files.

6. The method according to claim 5, wherein, in a search processing in response to a search instruction including designation of keyword information from the host apparatus, searching, with the full-text search server apparatus, the index information using the keyword information to acquire a first search result including information about the representative file and using the second information to add, to the information of the representative file included in the first search result, information of another file having the same content as that of the representative file and create a second search result, thereby responding to the host apparatus.

7. The method according to claim 6, wherein the index information has metadata of the file, wherein the first information includes information for discriminating a representative file obtained according to the de-duplicate processing, wherein the second information includes flag information and link information between files in a group of files having the same content, and wherein the keyword occurrence position information about a plurality of files having the same content is not reserved in a duplication manner by inhibiting keyword extraction processing.

8. The method according to claim 6, wherein, in an index information creation processing to target files read from the storage area, creating, with the full-text search server apparatus, the second information from the first information to store the second information in the index information in association with the first information.

9. The method according to claim 6, further comprising:

creating and managing, with the de-duplicate processing unit, signature hash information about the representative file and using the signature hash information to determine and detect about files having the same content.

10. The method according to claim 4, wherein the file server apparatus is coupled between the host apparatus and the storage area, wherein the full-text search processing apparatus is coupled between the host apparatus and the index information, and wherein the host apparatus and the file server apparatus are coupled between the full-text search server apparatus and the storage area.

* * * * *